United States Patent
Chang et al.

(10) Patent No.: US 10,373,140 B1
(45) Date of Patent: Aug. 6, 2019

(54) METHOD AND SYSTEM FOR DETECTING FRAUDULENT BILL PAYMENT TRANSACTIONS USING DYNAMIC MULTI-PARAMETER PREDICTIVE MODELING

(71) Applicant: Intuit Inc., Mountain View, CA (US)

(72) Inventors: Eva Diane Chang, Mountain View, CA (US); Michael Brener, Petach Tikva (IL)

(73) Assignee: Intuit Inc., Mountain View, CA (US)

( * ) Notice: Subject to any disclaimer, the term of this patent is extended or adjusted under 35 U.S.C. 154(b) by 761 days.

(21) Appl. No.: 14/922,643

(22) Filed: Oct. 26, 2015

(51) Int. Cl.
| | |
|---|---|
| *G06Q 40/00* | (2012.01) |
| *G06Q 20/14* | (2012.01) |
| *G06Q 30/04* | (2012.01) |
| *G06Q 20/40* | (2012.01) |
| *G06N 5/04* | (2006.01) |
| *G06N 20/00* | (2019.01) |
| *G06F 16/2457* | (2019.01) |

(52) U.S. Cl.
CPC ....... *G06Q 20/14* (2013.01); *G06F 16/24575* (2019.01); *G06F 16/24578* (2019.01); *G06N 5/04* (2013.01); *G06N 20/00* (2019.01); *G06Q 20/40* (2013.01); *G06Q 30/04* (2013.01)

(58) Field of Classification Search
CPC ........ G06Q 20/14; G06Q 20/40; G06Q 30/04; G06F 17/30528; G06F 17/3053; G06N 5/04; G06N 99/05
USPC .......................................................... 705/40
See application file for complete search history.

(56) References Cited

U.S. PATENT DOCUMENTS

| | | |
|---|---|---|
| 6,826,536 B1 | 11/2004 | Forman |
| 7,686,214 B1 | 3/2010 | Shao et al. |
| 8,607,353 B2 | 12/2013 | Rippert, Jr. et al. |
| 8,639,522 B2 | 1/2014 | Pathria et al. |
| 8,776,168 B1 | 7/2014 | Gibson et al. |
| 8,966,640 B1 | 2/2015 | Peddada et al. |
| 9,038,134 B1 | 5/2015 | Ackerman et al. |

(Continued)

FOREIGN PATENT DOCUMENTS

KR 10-2006-0090834 8/2006

OTHER PUBLICATIONS

There's Never a Finish Line in the Race to Understand Technology. Keeping Up Is the Only Way to Get AheadBank Technology News15.11: 44. SourceMedia, Inc. (Nov. 2002) (Year: 2002).*

*Primary Examiner* — Lalita M Hamilton
(74) *Attorney, Agent, or Firm* — Hawley Troxell Ennis & Hawley LLP; Philip McKay

(57) ABSTRACT

A method and system for detecting fraudulent bill payment service transactions using dynamic multi-parameter predictive modeling provides for detecting fraudulent bill payment transactions more accurately. Therefore, a technical solution to the long standing technical problem of inaccurate fraudulent bill payment transaction detection is provided. In addition, the method and system for detecting fraudulent bill payment service transactions using dynamic multi-parameter predictive modeling is capable of self-learning and dynamically adapting to new data and/or a changing threat environment. Consequently, a technical solution to the long standing technical problem of static and inflexible fraudulent bill payment transaction detection is also provided.

30 Claims, 3 Drawing Sheets

(56) References Cited

U.S. PATENT DOCUMENTS

| | | |
|---|---|---|
| 2002/0052841 A1* | 5/2002 | Guthrie .................. G06Q 20/04 705/40 |
| 2003/0229519 A1 | 12/2003 | Eidex et al. |
| 2007/0294104 A1 | 12/2007 | Boaz et al. |
| 2007/0294195 A1 | 12/2007 | Curry et al. |
| 2008/0086342 A1 | 4/2008 | Curry et al. |
| 2010/0077445 A1 | 3/2010 | Schneider et al. |
| 2010/0082384 A1 | 4/2010 | Bohrer et al. |
| 2010/0332362 A1 | 12/2010 | Ramsey et al. |
| 2011/0231257 A1 | 9/2011 | Winter |
| 2012/0030076 A1 | 2/2012 | Checco et al. |
| 2012/0030079 A1 | 2/2012 | Slater et al. |
| 2012/0030080 A1 | 2/2012 | Slater et al. |
| 2012/0226591 A1 | 9/2012 | Ramsey et al. |
| 2012/0311684 A1 | 12/2012 | Paulsen et al. |
| 2012/0317027 A1* | 12/2012 | Luk ........................ G06Q 40/02 705/44 |
| 2013/0117278 A1 | 5/2013 | Martens et al. |
| 2013/0346302 A1* | 12/2013 | Purves ................ G06Q 20/102 705/40 |
| 2014/0278479 A1 | 9/2014 | Wang et al. |
| 2015/0012430 A1* | 1/2015 | Chisholm .......... G06Q 20/4016 705/44 |
| 2015/0033305 A1 | 1/2015 | Shear et al. |
| 2015/0046181 A1* | 2/2015 | Adjaoute .............. G06F 19/328 705/2 |
| 2015/0161622 A1 | 6/2015 | Hoffmann et al. |
| 2015/0220734 A1 | 8/2015 | Nalluri et al. |
| 2016/0063645 A1 | 3/2016 | Houseworth et al. |
| 2016/0086185 A1 | 3/2016 | Adjaoute |
| 2016/0112451 A1 | 4/2016 | Jevans |
| 2016/0148321 A1 | 5/2016 | Ciaramitaro et al. |
| 2016/0379182 A1 | 12/2016 | Sheng et al. |
| 2017/0148021 A1 | 5/2017 | Goldstein et al. |
| 2017/0178249 A1 | 6/2017 | Pigoski, II et al. |
| 2017/0200137 A1 | 7/2017 | Vilmont |
| 2017/0293763 A1 | 10/2017 | Shear et al. |
| 2018/0033006 A1 | 2/2018 | Goldman et al. |
| 2018/0033009 A1 | 2/2018 | Goldman et al. |
| 2018/0033089 A1 | 2/2018 | Goldman et al. |
| 2018/0239870 A1 | 8/2018 | Goldman et al. |

* cited by examiner

METHOD AND SYSTEM FOR DETECTING FRAUDULENT BILL PAYMENT TRANSACTIONS USING DYNAMIC MULTI-PARAMETER PREDICTIVE MODELING

BACKGROUND

Currently, several bill payment systems are available to help a bill payment system user, or any authorized party acting on behalf of a bill payment system user, pay bills and invoices from various merchants, and/or other payee parties, using one or more user computing systems, including, but not limited to, mobile computing systems, such as smart phones.

Currently, bill payment systems typically obtain electronic bill payment transaction data, herein referred to as bill payment transaction data, including, but not limited to, payee data, payment amount data, and payment date data, from the bill payment system user, and/or a user version/portion of the bill payment system implemented on a user computing system. In addition, the bill payment system user also typically provides payment source data, such as account/card identification data and user access data associated with one or more payment sources, such as a credit card or bank account associated with the user. In some cases, the payment source data is provided at the time the bill payment transaction is being requested/sent, through the bill payment system, in other cases the payment source data is provided to the bill payment system in advance of the particular bill payment transaction being conducted and then the pre-registered payment source is simply designated by the user.

When used correctly, and by properly authorized parties using properly authorized payment sources, bill payment systems represent a significant convenience to both the bill payment system user, i.e., the payor, and the merchant, or payee party, receiving the bill payments through the bill payment system. However, as with all remote funds transfer/payment systems, and particularly electronic payment systems using the Internet and multiple remote and/or mobile computing systems, there is ample opportunity for various types of fraud.

In the bill payment system environment, bill payment transaction fraud typically involves a fraudulent bill payment system user, or "fraudster," who uses the bill payment system, and/or payment sources and payment source data that the fraudulent bill payment system user is not authorized to use, to make unauthorized bill payments, i.e. conduct fraudulent bill payment transactions. As one common example, the fraudulent bill payment system user obtains stolen credit card and/or identity information belonging to an authorized owner of the credit card and/or identity information and then the fraudulent bill payment system user utilizes this payment source data to pay his or her bills through the bill payment system.

These types of fraudulent bill payment transactions account for significant amounts of money being fraudulently transferred to merchants to pay fraudster bills. Typically, the bill payment system provider, and/or credit card payment source provider, must then reimburse the innocent authorized credit card holder. To make matters worse, the bill payment system provider, and/or credit card payment source provider, must then spend significant resources trying, often unsuccessfully, to track down the fraudulent bill payment system user.

To try and avoid this result, some credit card and payment source providers implement currently available fraud "prevention" systems. However, current methods for identifying potential fraud used in these currently available fraud prevention systems are typically just "static bright line" parameters/rules based systems that are ineffective at accurately detecting/predicting fraud and, in operation, are really just fraud mitigation systems designed to minimize the liability incurred by the bill payment system provider, or credit card payment source provider, as opposed to actually detecting, predicting, and preventing fraudulent transactions.

More problematic is the fact that using currently available static bright line parameters/rules based fraud prevention systems results in a significant percentage of false positive results, i.e., the incorrect identification of legitimate transactions as being potential fraudulent transactions. This large rate of false positives arises because the currently used fraud detection parameters are simplistically and statically defined with the result that, in operation, the static bright line parameters/rules based fraud prevention systems only focus on fraud mitigation, as opposed to fraud detection and prediction.

As a specific illustrative example, a typical static bright line parameter/rule used with currently available fraud prevention systems is to label all transactions involving a transaction amount above a defined value, such as $500, as potentially fraudulent and requiring investigation by a fraud avoidance and mitigation team or system. It is obvious on its face that using this type of static bright line approach will result in many legitimate transactions, i.e., any transaction having an amount of $500 or more, being deemed a potentially fraudulent transaction.

Clearly this type of static bright line parameter/rule based approach is far more reflective of the credit card provider's dollar amount risk tolerance than any empirically based prediction or indication of actual fraud. However, currently, the prevailing theory is that it is better to have overkill, i.e., more false positives, than under kill, i.e., more high value fraudulent transactions. However, it is often the case that the implementation of this overkill theory is deceptive in terms of the actual cost associated with using these currently available fraud prevention systems.

For instance, each false positive result identified by currently available fraud prevention systems must be investigated, often manually, and therefore the cost associated with providing investigators, and investigative systems, can be significant. As a result, due to the need to provide standing resources to accommodate large numbers of false positives, the cost of currently available fraud prevention systems can potentially outweigh actual losses incurred if no fraud prevention system were in place at all, at least until the fraudsters figured out there was no fraud prevention system in place.

Another problem with the static bright line parameters/rules used in currently available fraud prevention systems, and the resulting large number of false positive results, is that greater numbers of legitimate users of the bill payment/payment source will have their transactions declined, or at least delayed. This, in turn, inevitably leads to frustrated users, and eventually decreased business and revenue. Again, this loss of revenue can potentially outweigh actual loses if no fraud prevention system were in place.

One other problem with currently used fraud prevention systems is that the static bright line parameters/rules are typically hard-coded so that, once deployed, the parameters/rules can only be modified through patches and/or revised versions of the fraud prevention system. Consequently, when the fraudulent activity environment changes, as it always does, or there is a desire to change parameters/risk tolerance levels, the fraud prevention system must be modified by producing patches and/or new versions, i.e., re-writing the code. This re-writing of the code is done by highly trained, and expensive, personnel, such as coders, computer scientists, and engineers. Consequently, keeping currently available static bright line parameters/rules based fraud prevention systems up to date, and ready to face new threats and conditions, which inevitably arise in the real world, involves the significant expense of using highly paid specialists on a regular basis.

As a result of at least the issues discussed above associated with currently available fraud prevention systems, the inherent inaccuracy and static nature of currently available methods for preventing fraudulent bill payment transactions represents a long standing technical problem in the bill payment industry.

What is needed is a method and system for detecting fraudulent bill payment transactions more accurately that is capable of self-learning and dynamically adapting to new data and/or a changing threat environment.

SUMMARY

In accordance with one embodiment, a method and system for detecting fraudulent bill payment service transactions using dynamic multi-parameter predictive modeling provides for detecting fraudulent bill payment transactions more accurately. Therefore, the disclosed embodiments provide a technical solution to the long standing technical problem of inaccurate fraudulent bill payment transaction detection.

In addition, in accordance with one embodiment, a method and system for detecting fraudulent bill payment service transactions using dynamic multi-parameter predictive modeling is also capable of self-learning and dynamically adapting to new data and/or a changing threat environment. Consequently, the method and system for detecting fraudulent bill payment service transactions using dynamic multi-parameter predictive modeling provides a technical solution to the long standing technical problem of static and inflexible fraudulent bill payment transaction detection parameters/rules and systems.

In accordance with one embodiment, a bill payment system is provided using one or more computing systems.

In one embodiment, historical bill payment transaction data representing bill payment transactions conducted through the bill payment system is collected.

In one embodiment, historical fraudulent bill payment transactions are identified.

In one embodiment, historical fraudulent bill payment transactions data representing the historical fraudulent bill payment transactions is obtained.

In one embodiment, the historical fraudulent bill payment transactions data is processed using one or more processors and one or more machine learning algorithms of a fraudulent activity predictive model.

In one embodiment, the fraudulent activity predictive model is used to generate potential fraudulent bill payment transaction scoring parameters data based, at least in part, on the values of one or more interconnected potential fraudulent activity parameter/rule input variables identified in the historical fraudulent bill payment transactions data.

In one embodiment, the potential fraudulent bill payment transaction scoring parameters data is used to create a potential fraudulent bill payment transaction scoring engine, the potential fraudulent bill payment transaction scoring engine for determining and assigning a potential fraudulent bill payment transaction score to new bill payment transaction data based, at least in part, on analysis of one or more interconnected potential fraudulent bill payment parameters identified in the current bill payment transaction and the potential fraudulent bill payment transaction scoring parameters data.

In one embodiment, one or more threshold potential fraudulent bill payment transaction score values are defined and threshold potential fraudulent bill payment transaction score value data is generated representing the one or more threshold potential fraudulent bill payment transaction score values.

In one embodiment, current bill payment transaction data is received representing a current bill payment transaction being requested through the bill payment system by a user of the bill payment system.

In one embodiment, before allowing the current bill payment transaction to be conducted, the current bill payment transaction data is provided to the potential fraudulent bill payment transaction scoring engine for analysis.

In one embodiment, a potential fraudulent bill payment transaction score value to be associated with the current bill payment transaction data is determined based, at least in part, on the analysis of the current bill payment transaction data by the potential fraudulent bill payment transaction scoring engine.

In one embodiment, based, at least in part, on the potential fraudulent bill payment transaction score value associated with the current bill payment transaction data, one of the following actions is taken:

The current bill payment transaction is prevented/stopped;

A hold is placed on the current bill payment transaction until the current bill payment transaction is authorized through a bill payment transaction inspection system; or The current bill payment transaction is allowed.

In one embodiment, the operations of: collecting the historical bill payment transaction data representing bill payment transactions conducted through the bill payment system; identifying historical fraudulent bill payment transactions; obtaining historical fraudulent bill payment transactions data representing the historical fraudulent bill payment transactions; and processing the historical fraudulent bill payment transactions data using one or more machine learning algorithms of a fraudulent activity predictive model, are performed on a periodic basis to dynamically update the potential fraudulent bill payment transaction scoring parameters data on a periodic basis. In this way, a self-learning method and system for detecting fraudulent bill payment transactions using dynamic multi-parameter predictive modeling is created and maintained.

Using the disclosed embodiments of a method and system for detecting fraudulent bill payment service transactions using dynamic multi-parameter predictive modeling, a method and system for detecting fraudulent bill payment transactions more accurately is provided. Therefore, the disclosed embodiments provide a technical solution to the long standing technical problem of inaccurate fraudulent bill payment transaction detection.

In addition, the disclosed embodiments of a method and system for detecting fraudulent bill payment service transactions using dynamic multi-parameter predictive modeling are also capable of self-learning and dynamically adapting to new data and/or a changing threat environment. Consequently, the disclosed embodiments of a method and system for detecting fraudulent bill payment service transactions using dynamic multi-parameter predictive modeling also provide a technical solution to the long standing technical problem of static and inflexible fraudulent bill payment transaction detection.

The result is a much more accurate, adaptable, and robust, method and system to detect potentially fraudulent bill payment transactions that not only is more effective at detecting fraudulent bill payment transactions, but thereby serves to bolster confidence in the processing of all bill payment transactions. This, in turn, results in: less human and processor resources being dedicated to processing bill payment transactions incorrectly designated potentially fraudulent bill payment transactions, i.e., fewer false positives having to be processed and/or investigated; less memory and storage bandwidth being dedicated to buffering and storing bill payment transactions incorrectly designated potentially fraudulent bill payment transactions, i.e., fewer false positives having to be stored while they await further analysis; less communication bandwidth being utilized to transmit bill payment transactions incorrectly designated potentially fraudulent bill payment transactions, i.e., fewer false positives being passed around between various investigating parties and systems.

In addition, using the disclosed embodiments of a method and system for detecting fraudulent bill payment service transactions using dynamic multi-parameter predictive modeling, a self-learning and dynamically adaptive method and system for detecting fraudulent bill payment service transactions is provided that, once deployed, is self-correcting and can be customized to new conditions/parameters without the need for new coding, patches, or a new version release. Consequently, using the disclosed embodiments of a method and system for detecting fraudulent bill payment service transactions using dynamic multi-parameter predictive modeling, high value resources, such as coder, engineer, and scientist time and energy are conserved since there is no need for reactive deployments of new code and new versions each time parameters, and/or the operating/threat environment, change.

The disclosed method and system for detecting fraudulent bill payment transactions using dynamic multi-parameter predictive modeling does not encompass, embody, or preclude other forms of innovation in the area of fraudulent bill pay transaction detection or processing. In addition, the disclosed method and system for detecting fraudulent bill payment transactions using dynamic multi-parameter predictive modeling is not related to any fundamental economic practice, fundamental data processing practice, mental steps, or pen and paper based solutions, and is, in fact, directed to providing self-learning loop/tree, multi-parameter, predictive modeling based solutions to the relatively new problems associated with the processing of electronic bill payments through a bill payment service/system. Consequently, the disclosed method and system for detecting fraudulent bill payment transactions using dynamic multi-parameter predictive modeling is not directed to, does not encompass, and is not merely, an abstract idea or concept.

In addition, the disclosed method and system for detecting fraudulent bill payment transactions using dynamic multi-parameter predictive modeling provides for significant improvements to the technical fields of electronic transaction security and fraud prevention, electronic transaction data processing, financial transaction processing, information dissemination, data processing, data management, and user experience.

In addition, as discussed above, the disclosed method and system for detecting fraudulent bill payment transactions using dynamic multi-parameter predictive modeling provides for the entry, processing, and dissemination, of only relevant portions of data, i.e., more accurately identified potentially fraudulent bill payment transaction data; thereby eliminating unnecessary data analysis and correction before resources are allocated to processing, and/or correcting, faulty data, and/or the faulty data is further transmitted/distributed. Consequently, using the disclosed method and system for detecting fraudulent bill payment transactions using dynamic multi-parameter predictive modeling results in more efficient use of human and non-human resources, fewer processor cycles being utilized, reduced memory utilization, and less communications bandwidth being utilized to relay data to, and from, backend systems and client systems, and various investigative systems and parties. As a result, computing systems are transformed into faster, more efficient, and more effective computing systems by implementing the method and system for detecting fraudulent bill payment transactions using dynamic multi-parameter predictive modeling.

Figure 1:
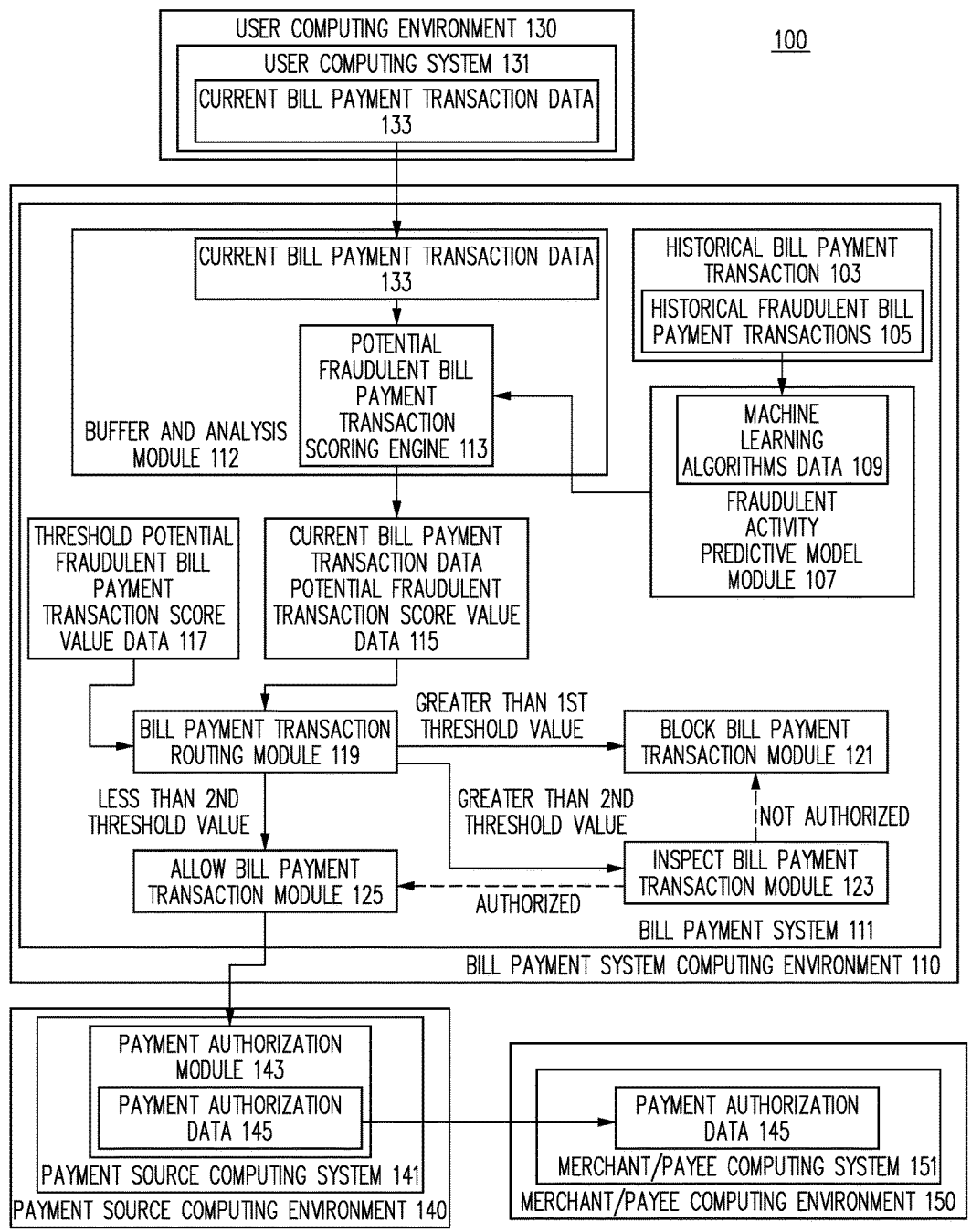
FIG. 1 is a high level functionality-based block diagram of a hardware and production environment for providing a process for detecting fraudulent bill payment transactions using dynamic multi-parameter predictive modeling, in accordance with one embodiment.

Common reference numerals are used throughout the FIGS. and the detailed description to indicate like elements. One skilled in the art will readily recognize that the above FIGS. are examples and that other architectures, modes of operation, orders of operation, and elements/functions can be provided and implemented without departing from the characteristics and features of the invention, as set forth in the claims.

Term Definitions

Herein, the term "bill payment system" includes, but is not limited to, computing system implemented, and/or online, and/or web-based, personal and/or business bill payment systems, services, packages, programs, modules, or applications capable of facilitating any interaction between two or more parties involving the transfer, or re-categorization, of funds between the parties using electronic data associated with bill payment transactions.

A specific example of a bill payment system includes, but is not limited to, MintBills™, available from Intuit, Inc. of Mountain View, Calif.

Herein, the term "financial management system" includes, but is not limited to the following: computing system implemented, and/or online, and/or web-based, personal and/or business financial transaction aggregation and/or processing systems, services, packages, programs, modules, or applications; computing system implemented, and/or online, and/or web-based, personal and/or business financial management and budgeting systems, services, packages, programs, modules, or applications; computing system implemented, and/or online, and/or web-based, personal and/or business management systems, services, packages, programs, modules, or applications; computing system implemented, and/or online, and/or web-based, personal and/or business accounting and/or invoicing systems, services, packages, programs, modules, or applications; personal and/or business electronic tax preparation systems, services, packages, programs, modules, or applications; and various other personal and/or business electronic data management systems, services, packages, programs, modules, or applications, whether known at the time of filling or as developed later.

Specific examples of financial management systems include, but are not limited to the following: Mint™, available from Intuit, Inc. of Mountain View, Calif.; Mint Online™, available from Intuit, Inc. of Mountain View, Calif.; Quicken Online™, available from Intuit, Inc. of Mountain View, Calif.; QuickBooks™, available from Intuit, Inc. of Mountain View, Calif.; QuickBooks Online™, available from Intuit, Inc. of Mountain View, Calif.; TurboTax™ available from Intuit, Inc. of Mountain View, Calif.; TurboTax Online™ available from Intuit, Inc. of Mountain View, Calif.; Quicken™, available from Intuit, Inc. of Mountain View, Calif.; and/or various other software systems discussed herein, and/or known to those of skill in the art at the time of filing, and/or as developed after the time of filing.

Herein, the terms "software system" and "software application" are used interchangeably and can be, but are not limited to, any data management system implemented on a computing system, accessed through one or more servers, accessed through a network, accessed through a cloud, and/or provided through any system or by any means, as discussed herein, and/or as known in the art at the time of filing, and/or as developed after the time of filing, that gathers/obtains data, from one or more sources and/or has the capability to analyze at least part of the data.

As used herein, the terms "computing system," "computing device," and "computing entity," include, but are not limited to, the following: a server computing system; a workstation; a desktop computing system; a mobile computing system, including, but not limited to, smart phones, portable devices, and/or devices worn or carried by a user; a database system or storage cluster; a virtual asset; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms "computing system" and "computing entity," can denote, but are not limited to the following: systems made up of multiple virtual assets, server computing systems, workstations, desktop computing systems, mobile computing systems, database systems or storage clusters, switching systems, routers, hardware systems, communications systems, proxy systems, gateway systems, firewall systems, load balancing systems, or any devices that can be used to perform the processes and/or operations as described herein.

Herein, the terms "mobile computing system" and "mobile device" are used interchangeably and include, but are not limited to the following: a smart phone; a cellular phone; a digital wireless telephone; a tablet computing system; a notebook computing system; any portable computing system; a two-way pager; a Personal Digital Assistant (PDA); a media player; an Internet appliance; devices worn or carried by a user; or any other movable/mobile device and/or computing system that includes components that can execute all, or part, of any one of the processes and/or operations as described herein.

Herein, the term "production environment" includes the various components, or assets, used to deploy, implement, access, and use, a given software system as that software system is intended to be used. In various embodiments, production environments include multiple computing systems and/or assets that are combined, communicatively coupled, virtually and/or physically connected, and/or associated with one another, to provide the production environment implementing the application.

As specific illustrative examples, the assets making up a given production environment can include, but are not limited to, the following: one or more computing environments used to implement at least part of the software system in the production environment such as a data center, a cloud computing environment, a dedicated hosting environment, and/or one or more other computing environments in which one or more assets used by the application in the production environment are implemented; one or more computing systems or computing entities used to implement at least part of the software system in the production environment; one or more virtual assets used to implement at least part of the software system in the production environment; one or more supervisory or control systems, such as hypervisors, or other monitoring and management systems used to monitor and control assets and/or components of the production environment; one or more communications channels for sending and receiving data used to implement at least part of the software system in the production environment; one or more access control systems for limiting access to various components of the production environment, such as firewalls and gateways; one or more traffic and/or routing systems used to direct, control, and/or buffer data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement at least part of the software system in the production environment; one or more databases used to store data in the production environment; one or more internal or external services used to implement at least part of the software system in the production environment; one or more backend systems, such as backend servers or other hardware used to process data and implement at least part of the software system in the production environment; one or more software modules/functions used to implement at least part of the software system in the production environment; and/or any other assets/components making up an actual production environment in which at least part of the software system is deployed, implemented, accessed, and run, e.g., operated, as discussed herein, and/or as known in the art at the time of filing, and/or as developed after the time of filing.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known, "trusted" environments or unknown, "untrusted" environments. Typically, trusted computing environments are those where the assets, infrastructure, communication and networking systems, and security systems associated with the computing systems and/or virtual assets making up the trusted computing environment, are either under the control of, or known to, a party.

In various embodiments, each computing environment includes allocated assets and virtual assets associated with, and controlled or used to create, and/or deploy, and/or operate at least part of the software system.

In various embodiments, one or more cloud computing environments are used to create, and/or deploy, and/or operate at least part of the software system that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given software system or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, the following: virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing can be implemented as one or more virtual assets.

In one embodiment, two or more assets, such as computing systems and/or virtual assets, and/or two or more computing environments are connected by one or more communications channels including but not limited to, Secure Sockets Layer (SSL) communications channels and various other secure communications channels, and/or distributed computing system networks, such as, but not limited to the following: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, the following: a peer-to-peer network; a hybrid peer-to-peer network; a Local Area Network (LAN); a Wide Area Network (WAN); a public network, such as the Internet; a private network; a cellular network; any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user experience" includes not only the data entry and question submission process, but also other user experience features provided or displayed to the user such as, but not limited to the following: interfaces; images; backgrounds; avatars; highlighting mechanisms; icons; and any other features that individually, or in combination, create a user experience, as discussed herein, and/or as known in the art at the time of filing, and/or as developed after the time of filing.

Herein, the term "party," "user," "user consumer," and "customer" are used interchangeably to denote any party and/or entity that interfaces with, and/or to whom information is provided by, the method and system for detecting fraudulent bill payment transactions using dynamic multi-parameter predictive modeling described herein, and/or a person and/or entity that interfaces with, and/or to whom information is provided by, the method and system for detecting fraudulent bill payment transactions using dynamic multi-parameter predictive modeling described herein, and/or a legal guardian of person and/or entity that interfaces with, and/or to whom information is provided by, the method and system for detecting fraudulent bill payment transactions using dynamic multi-parameter predictive modeling described herein, and/or an authorized agent of any party and/or person and/or entity that interfaces with, and/or to whom information is provided by, the method and system for detecting fraudulent bill payment transactions using dynamic multi-parameter predictive modeling described herein. For instance, in various embodiments, a user can be, but is not limited to, a person, a commercial entity, an application, a service, and/or a computing system.

Herein, the term "bill payment transaction" includes, but is not limited to, any interaction between two or more parties involving the transfer, or re-categorization, of funds between the parties through an electronic data based bill payment system and/or service. Herein, the term "bill payment transaction data" includes, but is not limited to, electronic data representing at least one bill payment transaction and that is capable of being processed by a processor, and/or stored in a memory, and/or is otherwise machine readable.

Herein, the term "fraudulent bill payment transaction" includes, but is not limited to, any interaction between two or more parties involving the transfer, or re-categorization, of funds between the parties through an electronic data based bill payment system and/or service wherein the party transferring the funds, e.g., the payor, uses a source of funds, such as, but not limited to, a credit card or bank account, that the payor is not authorized to utilize. Herein, the term "fraudulent bill payment transaction data" includes, but is not limited to, electronic data representing at least one fraudulent bill payment transaction and that is capable of being processed by a processor, and/or stored in a memory, and/or is otherwise machine readable.

DETAILED DISCLOSURE

Embodiments will now be discussed with reference to the accompanying FIGS., which depict one or more exemplary embodiments. Embodiments may be implemented in many different forms and should not be construed as limited to the embodiments set forth herein, shown in the FIGS., and/or described below. Rather, these exemplary embodiments are provided to allow a complete disclosure that conveys the principles of the invention, as set forth in the claims, to those of skill in the art.

In accordance with one embodiment, a method and system for detecting fraudulent bill payment service transactions using dynamic multi-parameter predictive modeling provides for detecting fraudulent bill payment transactions more accurately. Therefore, the disclosed embodiments provide a technical solution to the long standing technical problem of inaccurate fraudulent bill payment transaction detection.

In addition, in accordance with one embodiment, a method and system for detecting fraudulent bill payment service transactions using dynamic multi-parameter predictive modeling is also capable of self-learning and dynamically adapting to new data and/or a changing threat environment. Consequently, the method and system for detecting fraudulent bill payment service transactions using dynamic multi-parameter predictive modeling provides a technical solution to the long standing technical problem of static and inflexible fraudulent bill payment transaction detection rules, parameters, and systems.

In accordance with one embodiment, a bill payment system is provided using one or more computing systems.

Herein, the term "bill payment system" includes, but is not limited to, computing system implemented, and/or online, and/or web-based, personal and/or business bill payment systems, services, packages, programs, modules, or applications capable of facilitating any interaction between two or more parties involving the transfer, or re-categorization, of funds between the parties using electronic data associated with bill payment transactions.

A specific example of a bill payment system includes, but is not limited to, MintBills™, available from Intuit, Inc. of Mountain View, Calif.

In one embodiment, as the provided bill payment system is utilized by users of the bill payment system, significant amounts of electronic bill payment transaction data, herein referred to as historic bill payment transaction data, is collected from multiple bill payment system users.

Herein, the term "bill payment transaction" includes, but is not limited to, any interaction between two or more parties involving the transfer, or re-categorization, of funds between the parties through an electronic data based bill payment system and/or service. Herein, the term "bill payment transaction data" includes, but is not limited to, electronic data representing at least one bill payment transaction and that is capable of being processed by a processor, and/or stored in a memory, and/or is otherwise machine readable.

In various embodiments, the historical bill payment transaction data includes, but is not limited to, payee data, payment amount data, payment date data, and payment source data, obtained from the bill payment system user, and/or a user version/portion of the bill payment system implemented on a user computing system.

In one embodiment, included in the historical bill payment transaction data representing bill payment transactions conducted through the bill payment system is data representing historical fraudulent bill payment transactions.

Herein, the term "fraudulent bill payment transaction" includes, but is not limited to, any interaction between two or more parties involving the transfer, or re-categorization, of funds between the parties through an electronic data based bill payment system and/or service wherein the party transferring the funds, e.g., the payor, uses a source of funds, such as, but not limited to, a credit card or bank account, that the payor is not authorized to utilize.

In one embodiment, historical fraudulent bill payment transactions are identified. In one embodiment, the historical fraudulent bill payment transactions are identified after the fact, and/or when they are prevented using the bill payment system's historical fraud prevention systems. Typically, the historical fraudulent bill payment transactions are identified when the bill payment system provider, or payment source provider, is notified of the fraudulent transactions and/or is required to reimburse the innocent victim of a fraudulent bill payment transaction.

In addition, historical fraudulent bill payment transactions data is obtained representing the details of the historical fraudulent bill payment transactions.

Herein, the term "fraudulent bill payment transaction data" includes, but is not limited to, electronic data representing at least one fraudulent bill payment transaction and that is capable of being processed by a processor, and/or stored in a memory, and/or is otherwise machine readable.

In various embodiments, the historical fraudulent bill payment transactions data is obtained from any source of historical fraudulent bill payment transactions data, as discussed herein, and/or as known in the art at the time of filing, and/or as developed/made available after the time of filing.

In one embodiment, the historical fraudulent bill payment transactions data is processed using one or more processors and one or more machine learning algorithms of a fraudulent activity predictive model.

In various embodiments, the historical fraudulent bill payment transactions data is analyzed using one or more machine learning algorithms to not only identify potential fraudulent bill payment parameters, i.e., common characteristics associated with the individual fraudulent bill payment transactions represented by historical fraudulent bill payment transactions data, but also the interconnection of the identified potential fraudulent bill payment parameters and expected, and abnormal, relationships between the potential fraudulent bill payment parameters identified in the historical fraudulent bill payment transactions data.

In one embodiment, the historical fraudulent bill payment transactions data is processed using a fraudulent activity predictive model that is a fraudulent activity ensemble method model and/or a regression and classification fraudulent activity model.

In one embodiment, an ensemble method and/or general regression and classification fraudulent activity predictive model is constructed as a linear combination of simple potential fraudulent activity parameters/rules derived from the historical fraudulent bill payment transactions data. In one embodiment, each potential fraudulent activity parameter/rule consists of a conjunction/ensemble of a small number of simple statements concerning the values of individual potential fraudulent activity parameter/rule input variables.

These potential fraudulent activity parameters/rules ensembles have been discovered by the Inventors to produce extremely reliable fraudulent activity predictive accuracy. In addition, because of its simple form, each potential fraudulent activity parameter/rule variable is easy to understand, as is its influence on individual fraudulent activity predictions, selected subsets of fraudulent activity predictions, or global fraudulent activity predictions over the entire space of joint input potential fraudulent activity parameter/rule input variable values. Similarly, the degree of relevance of the respective potential fraudulent activity parameter/rule input variable can be assessed globally, locally in different regions of the input space, or at individual potential fraudulent activity prediction points. Consequently, in one embodiment, the ensemble method and/or general regression and classification fraudulent activity predictive model assigns weights to the individual potential fraudulent activity parameters/rules variables, and related groups of potential fraudulent activity parameters/rules ensembles.

Ensemble method and/or general regression and classification predictive models are known in the art of modeling. Although ensemble methods and/or general regression and classification models have not historically been applied to potential fraudulent bill payment activity, the general concepts are known in the art of data modeling. Consequently, a more detailed discussion of the particular implementation of ensemble methods and/or general regression and classification models used as ensemble method and/or general regression and classification fraudulent activity predictive models is omitted herein, to avoid detracting from the invention.

In one embodiment, the individual potential fraudulent activity parameter/rule input variable types include, but are not limited to, one of the one or more individual potential fraudulent activity parameter/rule variable types selected from the group of individual potential fraudulent activity parameter/rule input variable types including, but not limited to: personal data associated with the user of the bill payment system; account information data associated with the account being utilized; historical user data representing historical bill payment transactions made through the bill payment system; and current bill payment transaction details data.

In one embodiment, the personal data associated with the user individual potential fraudulent activity parameter/rule input variable type includes at least one individual potential fraudulent activity parameter/rule input variable selected from the group of individual potential fraudulent activity parameter/rule input variables including, but not limited to: the domain name of an email address associated with the user; and the zip code of an address associated with the user.

In one embodiment, the account information data associated with the account being utilized individual potential fraudulent activity parameter/rule input variable type includes at least one individual potential fraudulent activity parameter/rule input variable selected from the group of individual potential fraudulent activity parameter/rule input variables including, but not limited to: a creation timestamp indicating when the user's account was created; a day of week obtained from the creation timestamp; an hour of day obtained from the creation timestamp; a day of month obtained from the creation timestamp; a month obtained from the creation timestamp; a year obtained from the creation timestamp; the number of anonymous provider/biller accounts; the number of anonymous ACH/bank accounts; the number of anonymous credit cards; the number of linked provider/biller accounts; the number of linked ACH/bank accounts; and the number of linked credit cards.

In one embodiment, the historical user data representing historical bill payment transactions made through the bill payment system individual potential fraudulent activity parameter/rule input variable type includes at least one individual potential fraudulent activity parameter/rule input variable selected from the group of individual potential fraudulent activity parameter/rule input variables including, but not limited to: number of logins to a mobile bill pay system application; number of distinct IP addresses used when logging into a mobile bill pay system application; number of logins to the bill pay system; number of distinct IP addresses used when logging into the bill pay system; number of logins to a web application associated with the bill pay system; number of distinct IP addresses used when logging into a web application associated with the bill pay system; number of logins to other applications; number of distinct IP addresses used when logging into other applications; number of payments classified as "good funds with error;" total amount of payments classified as "good funds with error;" fees associated with payments classified as "good funds with error;" number of payments classified as fraud; total amount of payments classified as fraud; fees associated with payments classified as fraud; number of payments resulting in money owed; total amount of payments resulting in money owed; fees associated with payments resulting in money owed; number of payments processed successfully; total amount of payments processed successfully; and fees associated with payments processed successfully.

In one embodiment, the current bill payment transaction details data individual potential fraudulent activity parameter/rule input variable type includes at least one individual potential fraudulent activity parameter/rule input variable selected from the group of individual potential fraudulent activity parameter/rule input variables including, but not limited to: whether for the current bill payment transaction, the payment method is anonymous; whether for the current bill payment transaction, the biller anonymous; when the current bill payment transaction was created; the amount of the current bill payment transaction; the fee associated with the current bill payment transaction; the category of the biller/payee; and whether for the current bill payment transaction the payment method is a credit card or bank account.

As noted above, in one embodiment, the ensemble method and/or general regression and classification fraudulent activity predictive model assigns weights to the individual potential fraudulent activity parameter/rule input variables, and/or potential fraudulent activity parameters/rules ensembles and/or groups.

In one embodiment, the fraudulent activity predictive model is used to generate potential fraudulent bill payment transaction scoring parameters data based, at least in part, on one or more interconnected potential fraudulent bill payment parameters, and/or the values of the individual potential fraudulent activity parameter/rule input variables, and/or groups/ensembles of individual potential fraudulent activity parameter/rule input variables identified in the historical fraudulent bill payment transactions data, and or individual potential fraudulent activity parameter/rule input variable values.

In one embodiment, the potential fraudulent bill payment transaction scoring parameters data is used to create a potential fraudulent bill payment transaction scoring engine.

In one embodiment, the potential fraudulent bill payment transaction scoring engine determines and assigns a potential fraudulent bill payment transaction score to provided current bill payment transaction data based, at least in part, on analysis of one or more interconnected potential fraudulent bill payment parameters, and/or the values of the individual potential fraudulent activity parameter/rule input variables, and/or groups/ensembles of individual potential fraudulent activity parameter/rule input variables identified in the current bill payment transaction and the potential fraudulent bill payment transaction scoring parameters data.

In one embodiment, one or more threshold potential fraudulent bill payment transaction score values are defined and threshold potential fraudulent bill payment transaction score value data is generated representing the one or more threshold potential fraudulent bill payment transaction score values.

In one embodiment, the one or more threshold potential fraudulent bill payment transaction score values include a first threshold potential fraudulent bill payment transaction score value and a second threshold potential fraudulent bill payment transaction score value, the first and second threshold potential fraudulent bill payment transaction score values being defined such that:

If a potential fraudulent bill payment transaction score value associated with a current bill payment transaction data is greater than the first defined threshold potential fraudulent bill payment transaction score value, the current bill payment transaction is prevented;

If the a potential fraudulent bill payment transaction score value associated with a current bill payment transaction data is less than the first defined threshold potential fraudulent bill payment transaction score value and greater than the second threshold potential fraudulent bill payment transaction score value, the current bill payment transaction is put on hold; and If the a potential fraudulent bill payment transaction score value associated with a current bill payment transaction data is less than the second defined threshold potential fraudulent bill payment transaction score value, the current bill payment transaction is allowed.

In one embodiment, current bill payment transaction data is received representing a current bill payment transaction being requested through the bill payment system by a user of the bill payment system.

In one embodiment, before allowing the current bill payment transaction to be conducted, the current bill payment transaction data is provided to the potential fraudulent bill payment transaction scoring engine for analysis.

In one embodiment, a potential fraudulent bill payment transaction score value to be associated with the current bill payment transaction data is determined, based, at least in part, on the analysis of the current bill payment transaction data by the potential fraudulent bill payment transaction scoring engine.

In one embodiment, based, at least in part, on the potential fraudulent bill payment transaction score value associated with the current bill payment transaction data, one of the following actions is taken.

The current bill payment transaction is prevented/stopped. In one embodiment, the current bill payment transaction is then investigated manually by one or more members of a fraud detection and prevention inspection team, and/or a fraud detection and prevention inspection system.

A hold is placed on the current bill payment transaction until the current bill payment transaction is authorized through a bill payment transaction inspection system. In one embodiment, the current bill payment transaction is investigated manually by one or more members of a fraud detection and prevention inspection team, and/or a fraud detection and prevention inspection system, and, if the current bill payment transaction is deemed not to be fraudulent, the current bill payment transaction is allowed to be processed.

The current bill payment transaction is allowed.

In one embodiment, the operations of collecting the historical bill payment transaction data representing bill payment transactions conducted through the bill payment system; identifying historical fraudulent bill payment transactions; obtaining historical fraudulent bill payment transactions data representing the historical fraudulent bill payment transactions; and processing the historical fraudulent bill payment transactions data using one or more machine learning algorithms of a fraudulent activity predictive model, is performed on a periodic basis to dynamically update the potential fraudulent bill payment transaction scoring parameters data on a periodic basis. In this way, a self-learning method for detecting fraudulent bill payment transactions using dynamic multi-parameter predictive modeling is created and maintained.

FIG. 1 is a high level functionality-based block diagram of a hardware and production environment 100 for providing a process for detecting fraudulent bill payment transactions using dynamic multi-parameter predictive modeling, in accordance with one embodiment.

As seen in FIG. 1, in this specific illustrative example, production environment 100 includes, bill payment system computing environment 110, user computing environment 130, payment source computing environment 140, and merchant/payee computing environment 150.

In various embodiments, bill payment system computing environment 110, user computing environment 130, payment source computing environment 140, and merchant/payee computing environment 150 are any computing environments as discussed herein, and/or as known in the art at the time of filing, and/or as developed after the time of filing. In various embodiments, bill payment system computing environment 110, user computing environment 130, payment source computing environment 140, and merchant/payee computing environment 150 can be combined, or further divided, into fewer, or more, computing environments.

As seen in FIG. 1, in one embodiment, a bill payment system 111 is provided in bill payment system computing environment 110. As also seen in FIG. 1, in one embodiment, historical bill payment transaction data 103, representing bill payment transactions conducted through bill payment system 111, is included in bill payment system 111. As discussed above, in one embodiment, historical bill payment transaction data 103 includes historical fraudulent bill payment transactions data 105, representing the historical fraudulent bill payment transactions included in historical bill payment transaction data 103.

In one embodiment, bill payment system 111 also includes fraudulent activity predictive model module 107 for analyzing historical fraudulent bill payment transactions data 105 using one or more machine learning algorithms of machine learning algorithms data 109. In one embodiment, fraudulent activity predictive model module 107 generates potential fraudulent bill payment transaction scoring parameters data (not shown) used to create potential fraudulent bill payment transaction scoring engine 113.

In one embodiment, a user generates current bill payment transaction data 133 through user computing system 131 in user computing system environment 130. In one embodiment, current bill payment transaction data 133 is transferred to buffer and analysis module 112 and potential fraudulent bill payment transaction scoring engine 113.

In one embodiment, potential fraudulent bill payment transaction scoring engine 113 determines and assigns current bill payment transaction data potential fraudulent transaction score value data 115 to current bill payment transaction data 113 based, at least in part, on analysis of one or more interconnected potential fraudulent bill payment parameters (not shown) identified in current bill payment transaction data 113.

In one embodiment, the current bill payment transaction data potential fraudulent transaction score value data 115 associated with current bill payment transaction data 113 is compared to threshold potential fraudulent bill payment transaction score value data 117 representing one or more threshold potential fraudulent bill payment transaction score values at bill payment transaction routing module 119.

In one embodiment, at bill payment transaction routing module 119 one of the following actions is taken.

If the current bill payment transaction data potential fraudulent bill payment transaction score value represented by current bill payment transaction data potential fraudulent transaction score value data 115 is greater than a first threshold potential fraudulent bill payment transaction score value represented in threshold potential fraudulent bill payment transaction score value data 117, current bill payment transaction data 113 is transferred to block bill payment transaction module 121 and the current bill payment transaction represented by current bill payment transaction data 113 is prevented/blocked.

If the current bill payment transaction data potential fraudulent bill payment transaction score value represented by current bill payment transaction data potential fraudulent transaction score value data 115 is less than the first threshold potential fraudulent bill payment transaction score value represented in threshold potential fraudulent bill payment transaction score value data 117 and greater than a second threshold potential fraudulent bill payment transaction score value represented in threshold potential fraudulent bill payment transaction score value data 117, current bill payment transaction data 113 is transferred to inspect bill payment transaction module 123 where the current bill payment transaction represented by current bill payment transaction data 113 is placed on hold until the current bill payment transaction is authorized through the bill payment transaction inspection system. If the current bill payment transaction is analyzed/inspected and then authorized through the bill payment transaction inspection system, current bill payment transaction data 113 is transferred to allow bill payment transaction module 125 and the current bill payment transaction represented by current bill payment transaction data 113 is allowed to proceed to payment authorization module 143 of payment source computing system 141 in payment source computing environment 140. If the current bill payment transaction is analyzed/inspected and then not authorized through the bill payment transaction inspection system, current bill payment transaction data 113 is transferred to block bill payment transaction module 121 where the current bill payment transaction represented by current bill payment transaction data 113 is prevented/blocked.

If the current bill payment transaction data potential fraudulent bill payment transaction score value represented by current bill payment transaction data potential fraudulent transaction score value data 115 is less than the second threshold potential fraudulent bill payment transaction score value represented in threshold potential fraudulent bill payment transaction score value data 117, current bill payment transaction data 113 is transferred to allow bill payment transaction module 125 and the current bill payment transaction represented by current bill payment transaction data 113 is allowed to proceed to payment authorization module 143 of payment source computing system 141 in payment source computing environment 140.

In one embodiment, if the current bill payment transaction represented by current bill payment transaction data 113 is allowed to proceed to payment authorization module 143 of payment source computing system 141 in payment source computing environment 140, payment authorization data 145 is generated by payment authorization module 143.

In one embodiment, payment authorization data 145 is then transferred to merchant/payee computing system 151 in merchant/payee computing environment 150 and payment is thereby made to the merchant/payee associated with current bill payment transaction data 113 and merchant/payee computing system 151.

Using the disclosed embodiments of a method and system for detecting fraudulent bill payment service transactions using dynamic multi-parameter predictive modeling, a method and system for detecting fraudulent bill payment transactions more accurately is provided. Therefore, the disclosed embodiments provide a technical solution to the long standing technical problem of inaccurate fraudulent bill payment transaction detection.

In addition, the disclosed embodiments of a method and system for detecting fraudulent bill payment service transactions using dynamic multi-parameter predictive modeling are also capable of self-learning and dynamically adapting to new data and/or a changing threat environment. Consequently, the disclosed embodiments of a method and system for detecting fraudulent bill payment service transactions using dynamic multi-parameter predictive modeling also provide a technical solution to the long standing technical problem of static and inflexible fraudulent bill payment transaction detection methods and systems.

The result is a much more accurate, adaptable, and robust, method and system to detect potentially fraudulent bill payment transactions that not only is more effective at detecting fraudulent bill payment transactions, but thereby serves to bolster confidence in the processing of all bill payment transactions. This, in turn, results in: less human and processor resources being dedicated to processing bill payment transactions incorrectly designated potentially fraudulent bill payment transactions, i.e., fewer false positives having to be processed and/or investigated; less memory and storage bandwidth being dedicated to buffering and storing bill payment transactions incorrectly designated potentially fraudulent bill payment transactions, i.e., fewer false positives having to be stored while they await further analysis; less communication bandwidth being utilized to transmit bill payment transactions incorrectly designated potentially fraudulent bill payment transactions, i.e., fewer false positives being passed around between various investigating parties and systems.

In addition, using the disclosed embodiments of a method and system for detecting fraudulent bill payment service transactions using dynamic multi-parameter predictive modeling, a self-learning and dynamically adaptive method and system for detecting fraudulent bill payment service transactions is provided that, once deployed, is self-correcting and can be customized to new conditions/parameters without the need for new coding, patches, or a new version release. Consequently, using the disclosed embodiments of a method and system for detecting fraudulent bill payment service transactions using dynamic multi-parameter predictive modeling, high value resources, such as coder, engineer, and scientist time and energy, are conserved since there is no need for reactive deployments of new code and new versions each time parameters, and/or the operating/threat environment, change.

The disclosed method and system for detecting fraudulent bill payment transactions using dynamic multi-parameter predictive modeling does not encompass, embody, or preclude other forms of innovation in the area of fraudulent bill pay transaction detection or processing. In addition, the disclosed method and system for detecting fraudulent bill payment transactions using dynamic multi-parameter predictive modeling is not related to any fundamental economic practice, fundamental data processing practice, mental steps, or pen and paper based solutions, and is, in fact, directed to providing self-learning loop/tree, multi-parameter, predictive modeling based solutions to the relatively new problems associated with the processing of electronic bill payments through a bill payment service/system. Consequently, the disclosed method and system for detecting fraudulent bill payment transactions using dynamic multi-parameter predictive modeling is not directed to, does not encompass, and is not merely, an abstract idea or concept.

In addition, the disclosed method and system for detecting fraudulent bill payment transactions using dynamic multi-parameter predictive modeling provides for significant improvements to the technical fields of electronic transaction security and fraud prevention, electronic transaction data processing, financial transaction processing, information dissemination, data processing, data management, and user experience.

In addition, as discussed above, the disclosed method and system for detecting fraudulent bill payment transactions using dynamic multi-parameter predictive modeling provides for the entry, processing, and dissemination, of only relevant portions of data, i.e., more accurately identified potentially fraudulent bill payment transaction data; thereby eliminating unnecessary data analysis and correction before resources are allocated to processing, and/or correcting, faulty data, and/or the faulty data is further transmitted/distributed. Consequently, using the disclosed method and system for detecting fraudulent bill payment transactions using dynamic multi-parameter predictive modeling results in more efficient use of human and non-human resources, fewer processor cycles being utilized, reduced memory utilization, and less communications bandwidth being utilized to relay data to, and from, backend systems and client systems, and various investigative systems and parties. As a result, computing systems are transformed into faster, more efficient, and more effective computing systems by implementing the method and system for detecting fraudulent bill payment transactions using dynamic multi-parameter predictive modeling.

Process

In accordance with one embodiment, a process for detecting fraudulent bill payment service transactions using dynamic multi-parameter predictive modeling provides for detecting fraudulent bill payment transactions more accurately. Therefore, the disclosed embodiments provide a technical solution to the long standing technical problem of inaccurate fraudulent bill payment transaction detection.

In addition, in accordance with one embodiment, a process for detecting fraudulent bill payment service transactions using dynamic multi-parameter predictive modeling is also capable of self-learning and dynamically adapting to new data and/or a changing threat environment. Consequently, the process for detecting fraudulent bill payment service transactions using dynamic multi-parameter predictive modeling provides a technical solution to the long standing technical problem of static and inflexible fraudulent bill payment transaction detection.

In accordance with one embodiment, a bill payment system is provided using one or more computing systems.

In one embodiment, historical bill payment transaction data representing bill payment transactions conducted through the bill payment system is collected.

In one embodiment, historical fraudulent bill payment transactions are identified.

In one embodiment, historical fraudulent bill payment transactions data representing the historical fraudulent bill payment transactions is obtained.

In one embodiment, the historical fraudulent bill payment transactions data is processed using one or more processors and one or more machine learning algorithms of a fraudulent activity predictive model.

In one embodiment, the fraudulent activity predictive model is used to generate potential fraudulent bill payment transaction scoring parameters data based, at least in part, on the values of one or more interconnected potential fraudulent activity parameter/rule input variables identified in the historical fraudulent bill payment transactions data, the potential fraudulent bill payment transaction scoring parameters data representing one or more potential fraudulent bill payment transaction scoring parameters;

In one embodiment, the potential fraudulent bill payment transaction scoring parameters data is used to create a potential fraudulent bill payment transaction scoring engine, the potential fraudulent bill payment transaction scoring engine for determining and assigning a potential fraudulent bill payment transaction score to provided current bill payment transaction data based, at least in part, on analysis of one or more interconnected potential fraudulent bill payment parameters identified in the current bill payment transaction and the potential fraudulent bill payment transaction scoring parameters data.

In one embodiment, one or more threshold potential fraudulent bill payment transaction score values are defined and threshold potential fraudulent bill payment transaction score value data is generated representing the one or more threshold potential fraudulent bill payment transaction score values.

In one embodiment, current bill payment transaction data is received representing a current bill payment transaction being requested through the bill payment system by a user of the bill payment system.

In one embodiment, before allowing the current bill payment transaction to be conducted, the current bill payment transaction data is provided to the potential fraudulent bill payment transaction scoring engine for analysis.

In one embodiment, a potential fraudulent bill payment transaction score value to be associated with the current bill payment transaction data is determined based, at least in part, on the analysis of the current bill payment transaction data by the potential fraudulent bill payment transaction scoring engine.

In one embodiment, based, at least in part, on the potential fraudulent bill payment transaction score value associated with the current bill payment transaction data, one of the following actions is taken:

The current bill payment transaction is prevented/stopped;

A hold is placed on the current bill payment transaction until the current bill payment transaction is authorized through a bill payment transaction inspection system; or The current bill payment transaction is allowed.

In one embodiment, the operations of: collecting the historical bill payment transaction data representing bill payment transactions conducted through the bill payment system; identifying historical fraudulent bill payment transactions; obtaining historical fraudulent bill payment transactions data representing the historical fraudulent bill payment transactions; and processing the historical fraudulent bill payment transactions data using one or more machine learning algorithms of a fraudulent activity predictive model, are performed on a periodic basis to dynamically update the potential fraudulent bill payment transaction scoring parameters data on a periodic basis. In this way, a self-learning method and system for detecting fraudulent bill payment transactions using dynamic multi-parameter predictive modeling is created and maintained.

Figure 2:
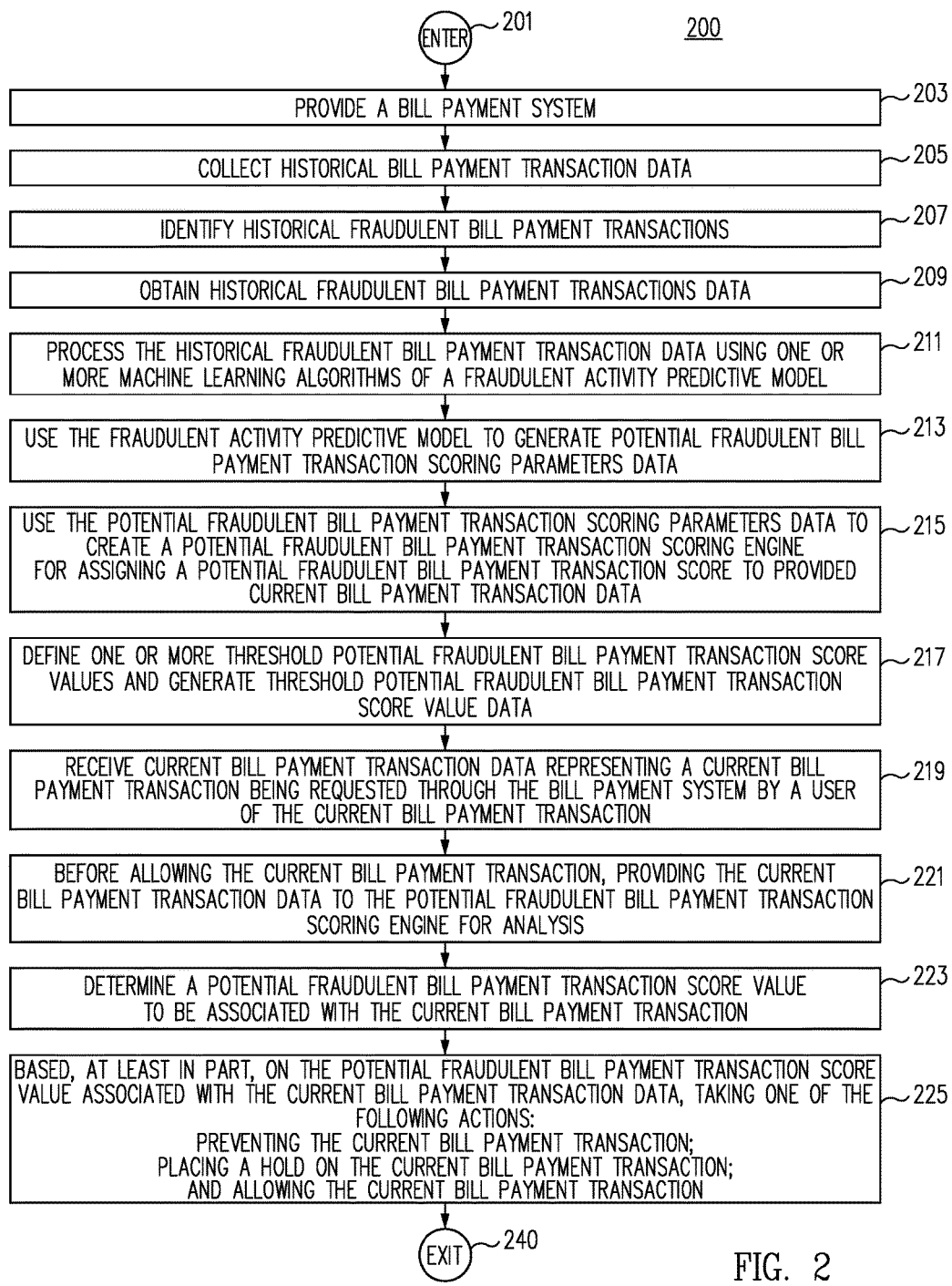
FIG. 2 is a flow chart representing one example of a generalized process for detecting fraudulent bill payment transactions using dynamic multi-parameter predictive modeling, in accordance with one embodiment.

FIG. 2 is a flow chart representing one example of a process 200 for detecting fraudulent bill payment transactions using dynamic multi-parameter predictive modeling in accordance with one embodiment.

As seen in FIG. 2, process 200 for detecting fraudulent bill payment transactions using dynamic multi-parameter predictive modeling begins at ENTER OPERATION 201 and process flow proceeds to PROVIDE A BILL PAYMENT SYSTEM OPERATION 203.

In one embodiment, at PROVIDE A BILL PAYMENT SYSTEM OPERATION 203, a bill payment system is provided using one or more computing systems.

In various embodiments, the bill payment system provided at PROVIDE A BILL PAYMENT SYSTEM OPERATION 203 is any bill payment system, as discussed herein, and/or as known in the art at the time of filing, and/or as becomes available after the time of filing.

In one embodiment, once a bill payment system is provided using one or more computing systems at PROVIDE A BILL PAYMENT SYSTEM OPERATION 203, process flow proceeds to COLLECT HISTORICAL BILL PAYMENT TRANSACTION DATA OPERATION 205.

In one embodiment, at COLLECT HISTORICAL BILL PAYMENT TRANSACTION DATA OPERATION 205 historical bill payment transactions data is obtained from one or more sources of historical bill payment transactions data In various embodiments, the historical bill payment transactions data is obtained at COLLECT HISTORICAL BILL PAYMENT TRANSACTION DATA OPERATION 205 from any source of historical fraudulent bill payment transactions data, as discussed herein, and/or as known in the art at the time of filing, and/or as developed/made available after the time of filing.

In one embodiment, as the bill payment system of PROVIDE A BILL PAYMENT SYSTEM OPERATION 203 is utilized by users of the bill payment system, significant amounts of electronic bill payment transaction data, herein referred to as historic bill payment transaction data, is collected from multiple bill payment system users. In one embodiment, at COLLECT HISTORICAL BILL PAYMENT TRANSACTION DATA OPERATION 205 this historic bill payment transaction data collected and/or obtained.

In various embodiments, the historical bill payment transaction data of COLLECT HISTORICAL BILL PAYMENT TRANSACTION DATA OPERATION 205 includes, but not limited to, payee data, payment amount data, payment date data, and payment source data, obtained from the bill payment system user, and/or a user version/portion of the bill payment system implemented on a user computing system.

In one embodiment, once historical bill payment transactions data is obtained from one or more sources of historical bill payment transactions data at COLLECT HISTORICAL BILL PAYMENT TRANSACTION DATA OPERATION 205, process flow proceeds to IDENTIFY HISTORICAL FRAUDULENT BILL PAYMENT TRANSACTIONS OPERATION 207.

In one embodiment, at IDENTIFY HISTORICAL FRAUDULENT BILL PAYMENT TRANSACTIONS OPERATION 207 historical fraudulent bill payment transactions included in the historical bill payment transactions data of COLLECT HISTORICAL BILL PAYMENT TRANSACTION DATA OPERATION 205 are identified.

In various embodiments, the historical bill payment transaction data of COLLECT HISTORICAL BILL PAYMENT TRANSACTION DATA OPERATION 205 includes data representing fraudulent bill payment transactions conducted through the bill payment system. In one embodiment, these historical fraudulent bill payment transactions are identified at IDENTIFY HISTORICAL FRAUDULENT BILL PAYMENT TRANSACTIONS OPERATION 207.

Herein, the term "fraudulent bill payment transaction" includes, but is not limited to, any interaction between two or more parties involving the transfer, or re-categorization, of funds between the parties through an electronic data based bill payment system and/or service wherein the party transferring the funds, e.g., the payor, uses a source of funds, such as, but not limited to, a credit card or bank account, that the payor is not authorized to utilize.

In one embodiment, the historical fraudulent bill payment transactions are identified at IDENTIFY HISTORICAL FRAUDULENT BILL PAYMENT TRANSACTIONS OPERATION 207 after the fact, and/or when they are prevented using the bill payment system's historical fraud prevention systems. Typically, the historical fraudulent bill payment transactions are identified at IDENTIFY HISTORICAL FRAUDULENT BILL PAYMENT TRANSACTIONS OPERATION 207 when the bill payment system provider, or payment source provider, is notified of the fraudulent transactions and/or is required to reimburse the innocent victim of a fraudulent bill payment transaction.

In one embodiment, once historical fraudulent bill payment transactions are identified at IDENTIFY HISTORICAL FRAUDULENT BILL PAYMENT TRANSACTIONS OPERATION 207, process flow proceeds to OBTAIN HISTORICAL FRAUDULENT BILL PAYMENT TRANSACTIONS DATA OPERATION 209

In one embodiment, at OBTAIN HISTORICAL FRAUDULENT BILL PAYMENT TRANSACTIONS DATA OPERATION 209 historical fraudulent bill payment transactions data representing the historical fraudulent bill payment transactions of IDENTIFY HISTORICAL FRAUDULENT BILL PAYMENT TRANSACTIONS OPERATION 207 is obtained.

Herein, the term "fraudulent bill payment transaction data" includes, but is not limited to, electronic data representing at least one fraudulent bill payment transaction and that is capable of being processed by a processor, and/or stored in a memory, and/or is otherwise machine readable.

In various embodiments, the historical fraudulent bill payment transactions data is obtained at OBTAIN HISTORICAL FRAUDULENT BILL PAYMENT TRANSACTIONS DATA OPERATION 209 from any source of historical fraudulent bill payment transactions data, as discussed herein, and/or as known in the art at the time of filing, and/or as developed/made available after the time of filing.

In one embodiment, once historical fraudulent bill payment transactions are identified and historical fraudulent bill payment transactions data representing the historical fraudulent bill payment transactions is obtained at OBTAIN HISTORICAL FRAUDULENT BILL PAYMENT TRANSACTIONS DATA OPERATION 209, process flow proceeds to PROCESS THE HISTORICAL FRAUDULENT BILL PAYMENT TRANSACTIONS DATA USING ONE OR MORE MACHINE LEARNING ALGORITHMS OF A FRAUDULENT ACTIVITY PREDICTIVE MODEL OPERATION 211.

In one embodiment, at PROCESS THE HISTORICAL FRAUDULENT BILL PAYMENT TRANSACTIONS DATA USING ONE OR MORE MACHINE LEARNING ALGORITHMS OF A FRAUDULENT ACTIVITY PREDICTIVE MODEL OPERATION 211, the historical fraudulent bill payment transactions data is processed using one or more processors and one or more machine learning algorithms of a fraudulent activity predictive model.

In various embodiments, the historical fraudulent bill payment transactions data is analyzed at PROCESS THE HISTORICAL FRAUDULENT BILL PAYMENT TRANSACTIONS DATA USING ONE OR MORE MACHINE LEARNING ALGORITHMS OF A FRAUDULENT ACTIVITY PREDICTIVE MODEL OPERATION 211 using one or more machine learning algorithms to not only identify potential fraudulent bill payment parameters, i.e., common characteristics associated with the individual fraudulent bill payment transactions represented by historical fraudulent bill payment transactions data, but also the interconnection of the identified potential fraudulent bill payment parameters and expected, and abnormal, relationships between the potential fraudulent bill payment parameters identified in the historical fraudulent bill payment transactions data.

In one embodiment, the historical fraudulent bill payment transactions data is processed at PROCESS THE HISTORICAL FRAUDULENT BILL PAYMENT TRANSACTIONS DATA USING ONE OR MORE MACHINE LEARNING ALGORITHMS OF A FRAUDULENT ACTIVITY PREDICTIVE MODEL OPERATION 211 using a fraudulent activity predictive model that is a fraudulent activity ensemble method model and/or a regression and classification fraudulent activity model.

In one embodiment, an ensemble method and/or general regression and classification fraudulent activity predictive model is constructed at PROCESS THE HISTORICAL FRAUDULENT BILL PAYMENT TRANSACTIONS DATA USING ONE OR MORE MACHINE LEARNING ALGORITHMS OF A FRAUDULENT ACTIVITY PREDICTIVE MODEL OPERATION 211 as a linear combination of simple potential fraudulent activity parameters/rules derived from the historical fraudulent bill payment transactions data. In one embodiment, each potential fraudulent activity parameter/rule consists of a conjunction/ensemble of a small number of simple statements concerning the values of individual potential fraudulent activity parameter/rule input variables.

These potential fraudulent activity parameters/rules ensembles have been discovered by the Inventors to produce extremely reliable fraudulent activity predictive accuracy. In addition, because of its simple form, each potential fraudulent activity parameter/rule variable is easy to understand, as is its influence on individual fraudulent activity predictions, selected subsets of fraudulent activity predictions, or global fraudulent activity predictions over the entire space of joint input potential fraudulent activity parameter/rule input variable values. Similarly, the degree of relevance of the respective potential fraudulent activity parameter/rule input variable can be assessed globally, locally in different regions of the input space, or at individual potential fraudulent activity prediction points. Consequently, in one embodiment, at PROCESS THE HISTORICAL FRAUDULENT BILL PAYMENT TRANSACTIONS DATA USING ONE OR MORE MACHINE LEARNING ALGORITHMS OF A FRAUDULENT ACTIVITY PREDICTIVE MODEL OPERATION 211 the ensemble method and/or general regression and classification fraudulent activity predictive model assigns weights to the individual potential fraudulent activity parameters/rules variables and potential fraudulent activity parameters/rules ensembles.

Ensemble method and/or general regression and classification predictive models are known in the art of modeling. Although ensemble methods and/or general regression and classification models have not historically been applied to potential fraudulent bill payment activity, the general concepts are known in the art of data modeling. Consequently, a more detailed discussion of the particular implementation of ensemble methods and/or general regression and classification models used as ensemble method and/or general regression and classification fraudulent activity predictive models is omitted herein, to avoid detracting from the invention.

In one embodiment, the individual potential fraudulent activity parameter/rule input variable types include, but are not limited to, one of the one or more individual potential fraudulent activity parameter/rule variable types selected from the group of individual potential fraudulent activity parameter/rule input variable types including, but not limited to: personal data associated with the user of the bill payment system; account information data associated with the account being utilized; historical user data representing historical bill payment transactions made through the bill payment system; and current bill payment transaction details data.

In one embodiment, the personal data associated with the user individual potential fraudulent activity parameter/rule input variable type includes at least one individual potential fraudulent activity parameter/rule input variable selected from the group of individual potential fraudulent activity parameter/rule input variables including, but not limited to: the domain name of an email address associated with the user; and the zip code of an address associated with the user.

In one embodiment, the account information data associated with the account being utilized individual potential fraudulent activity parameter/rule input variable type includes at least one individual potential fraudulent activity parameter/rule input variable selected from the group of individual potential fraudulent activity parameter/rule input variables including, but not limited to: a creation timestamp indicating when the user's account was created; a day of week obtained from the creation timestamp; an hour of day obtained from the creation timestamp; a day of month obtained from the creation timestamp; a month obtained from the creation timestamp; a year obtained from the creation timestamp; the number of anonymous provider/biller accounts; the number of anonymous ACH/bank accounts; the number of anonymous credit cards; the number of linked provider/biller accounts; the number of linked ACH/bank accounts; and the number of linked credit cards.

In one embodiment, the historical user data representing historical bill payment transactions made through the bill payment system individual potential fraudulent activity parameter/rule input variable type includes at least one individual potential fraudulent activity parameter/rule input variable selected from the group of individual potential fraudulent activity parameter/rule input variables including, but not limited to: number of logins to a mobile bill pay system application; number of distinct IP addresses used when logging into a mobile bill pay system application; number of logins to the bill pay system; number of distinct IP addresses used when logging into the bill pay system;

number of logins to a web application associated with the bill pay system; number of distinct IP addresses used when logging into a web application associated with the bill pay system; number of logins to other applications; number of distinct IP addresses used when logging into other applications; number of payments classified as "good funds with error;" total amount of payments classified as "good funds with error;" fees associated with payments classified as "good funds with error;" number of payments classified as fraud; total amount of payments classified as fraud; fees associated with payments classified as fraud; number of payments resulting in money owed; total amount of payments resulting in money owed; fees associated with payments resulting in money owed; number of payments processed successfully; total amount of payments processed successfully; and fees associated with payments processed successfully.

In one embodiment, the current bill payment transaction details data individual potential fraudulent activity parameter/rule input variable type includes at least one individual potential fraudulent activity parameter/rule input variable selected from the group of individual potential fraudulent activity parameter/rule input variables including, but not limited to: whether for the current bill payment transaction, the payment method is anonymous; whether for the current bill payment transaction, the biller anonymous; when the current bill payment transaction was created; the amount of the current bill payment transaction; the fee associated with the current bill payment transaction; the category of the biller/payee; and whether for the current bill payment transaction the payment method is a credit card or bank account.

As noted above, in one embodiment, the ensemble method and/or general regression and classification fraudulent activity predictive model of PROCESS THE HISTORICAL FRAUDULENT BILL PAYMENT TRANSACTIONS DATA USING ONE OR MORE MACHINE LEARNING ALGORITHMS OF A FRAUDULENT ACTIVITY PREDICTIVE MODEL OPERATION 211 assigns weights to the individual potential fraudulent activity parameter/rule input variables, and/or potential fraudulent activity parameters/rules ensembles and/or groups.

In one embodiment, once the historical fraudulent bill payment transactions data is processed using one or more processors and one or more machine learning algorithms of a fraudulent activity predictive model at PROCESS THE HISTORICAL FRAUDULENT BILL PAYMENT TRANSACTIONS DATA USING ONE OR MORE MACHINE LEARNING ALGORITHMS OF A FRAUDULENT ACTIVITY PREDICTIVE MODEL OPERATION 211, process flow proceeds to USE THE FRAUDULENT ACTIVITY PREDICTIVE MODEL TO GENERATE POTENTIAL FRAUDULENT BILL PAYMENT TRANSACTION SCORING PARAMETERS DATA OPERATION 213.

In one embodiment, at USE THE FRAUDULENT ACTIVITY PREDICTIVE MODEL TO GENERATE POTENTIAL FRAUDULENT BILL PAYMENT TRANSACTION SCORING PARAMETERS DATA OPERATION 213, the fraudulent activity predictive model of PROCESS THE HISTORICAL FRAUDULENT BILL PAYMENT TRANSACTIONS DATA USING ONE OR MORE MACHINE LEARNING ALGORITHMS OF A FRAUDULENT ACTIVITY PREDICTIVE MODEL OPERATION 211 is used to generate potential fraudulent bill payment transaction scoring parameters data based, at least in part, on one or more interconnected potential fraudulent bill payment parameters, and/or the values of the individual potential fraudulent activity parameter/rule input variables, and/or groups/ensembles of individual potential fraudulent activity parameter/rule input variables identified in the historical fraudulent bill payment transactions data, and or individual potential fraudulent activity parameter/rule input variable values.

In one embodiment, once the fraudulent activity predictive model of PROCESS THE HISTORICAL FRAUDULENT BILL PAYMENT TRANSACTIONS DATA USING ONE OR MORE MACHINE LEARNING ALGORITHMS OF A FRAUDULENT ACTIVITY PREDICTIVE MODEL OPERATION 211 is used to generate potential fraudulent bill payment transaction scoring parameters data based, at least in part, on one or more interconnected potential fraudulent bill payment parameters, and/or the values of the individual potential fraudulent activity parameter/rule input variables, and/or groups/ensembles of individual potential fraudulent activity parameter/rule input variables identified in the historical fraudulent bill payment transactions data, and or individual potential fraudulent activity parameter/rule input variable values at USE THE FRAUDULENT ACTIVITY PREDICTIVE MODEL TO GENERATE POTENTIAL FRAUDULENT BILL PAYMENT TRANSACTION SCORING PARAMETERS DATA OPERATION 213, process flow proceeds to USE THE POTENTIAL FRAUDULENT BILL PAYMENT TRANSACTION SCORING PARAMETERS DATA TO CREATE A POTENTIAL FRAUDULENT BILL PAYMENT TRANSACTION SCORING ENGINE FOR ASSIGNING A POTENTIAL FRAUDULENT BILL PAYMENT TRANSACTION SCORE TO PROVIDED CURRENT BILL PAYMENT TRANSACTION DATA OPERATION 215.

In one embodiment, at USE THE POTENTIAL FRAUDULENT BILL PAYMENT TRANSACTION SCORING PARAMETERS DATA TO CREATE A POTENTIAL FRAUDULENT BILL PAYMENT TRANSACTION SCORING ENGINE FOR ASSIGNING A POTENTIAL FRAUDULENT BILL PAYMENT TRANSACTION SCORE TO PROVIDED CURRENT BILL PAYMENT TRANSACTION DATA OPERATION 215, the potential fraudulent bill payment transaction scoring parameters data of USE THE FRAUDULENT ACTIVITY PREDICTIVE MODEL TO GENERATE POTENTIAL FRAUDULENT BILL PAYMENT TRANSACTION SCORING PARAMETERS DATA OPERATION 213 is used to create a potential fraudulent bill payment transaction scoring engine.

In one embodiment, the potential fraudulent bill payment transaction scoring engine of USE THE POTENTIAL FRAUDULENT BILL PAYMENT TRANSACTION SCORING PARAMETERS DATA TO CREATE A POTENTIAL FRAUDULENT BILL PAYMENT TRANSACTION SCORING ENGINE FOR ASSIGNING A POTENTIAL FRAUDULENT BILL PAYMENT TRANSACTION SCORE TO PROVIDED CURRENT BILL PAYMENT TRANSACTION DATA OPERATION 215 determines and assigns a potential fraudulent bill payment transaction score to new bill payment transaction data based, at least in part, on analysis of one or more interconnected potential fraudulent bill payment parameters, and/or the values of the individual potential fraudulent activity parameter/rule input variables, and/or groups/ensembles of individual potential fraudulent activity parameter/rule input variables identified in the current bill payment transaction and the potential fraudulent bill payment transaction scoring parameters data.

In one embodiment, once the potential fraudulent bill payment transaction scoring parameters data is used to create a potential fraudulent bill payment transaction scoring engine at USE THE POTENTIAL FRAUDULENT BILL PAYMENT TRANSACTION SCORING PARAMETERS DATA TO CREATE A POTENTIAL FRAUDULENT BILL PAYMENT TRANSACTION SCORING ENGINE FOR ASSIGNING A POTENTIAL FRAUDULENT BILL PAYMENT TRANSACTION SCORE TO PROVIDED CURRENT BILL PAYMENT TRANSACTION DATA OPERATION 215, process flow proceeds to DEFINE ONE OR MORE THRESHOLD POTENTIAL FRAUDULENT BILL PAYMENT TRANSACTION SCORE VALUES AND GENERATE THRESHOLD POTENTIAL FRAUDULENT BILL PAYMENT TRANSACTION SCORE VALUE DATA OPERATION 217.

In one embodiment, at DEFINE ONE OR MORE THRESHOLD POTENTIAL FRAUDULENT BILL PAYMENT TRANSACTION SCORE VALUES AND GENERATE THRESHOLD POTENTIAL FRAUDULENT BILL PAYMENT TRANSACTION SCORE VALUE DATA OPERATION 217, one or more threshold potential fraudulent bill payment transaction score values are defined and threshold potential fraudulent bill payment transaction score value data is generated representing the one or more threshold potential fraudulent bill payment transaction score values.

In one embodiment, the one or more threshold potential fraudulent bill payment transaction score values of DEFINE ONE OR MORE THRESHOLD POTENTIAL FRAUDULENT BILL PAYMENT TRANSACTION SCORE VALUES AND GENERATE THRESHOLD POTENTIAL FRAUDULENT BILL PAYMENT TRANSACTION SCORE VALUE DATA OPERATION 217 include a first threshold potential fraudulent bill payment transaction score value and a second threshold potential fraudulent bill payment transaction score value. In one embodiment, the first and second threshold potential fraudulent bill payment transaction score values are defined at DEFINE ONE OR MORE THRESHOLD POTENTIAL FRAUDULENT BILL PAYMENT TRANSACTION SCORE VALUES AND GENERATE THRESHOLD POTENTIAL FRAUDULENT BILL PAYMENT TRANSACTION SCORE VALUE DATA OPERATION 217 such that: If a potential fraudulent bill payment transaction score value associated with a current bill payment transaction data is greater than the first defined threshold potential fraudulent bill payment transaction score value, the current bill payment transaction is prevented; If a potential fraudulent bill payment transaction score value associated with a current bill payment transaction data is less than the first defined threshold potential fraudulent bill payment transaction score value and greater than the second threshold potential fraudulent bill payment transaction score value, the current bill payment transaction is put on hold; and If the a potential fraudulent bill payment transaction score value associated with a current bill payment transaction data is less than the second defined threshold potential fraudulent bill payment transaction score value, the current bill payment transaction is allowed.

In one embodiment, once one or more threshold potential fraudulent bill payment transaction score values are defined and threshold potential fraudulent bill payment transaction score value data is generated representing the one or more threshold potential fraudulent bill payment transaction score value sat DEFINE ONE OR MORE THRESHOLD POTENTIAL FRAUDULENT BILL PAYMENT TRANSACTION SCORE VALUES AND GENERATE THRESHOLD POTENTIAL FRAUDULENT BILL PAYMENT TRANSACTION SCORE VALUE DATA OPERATION 217, process flow proceeds to RECEIVE CURRENT BILL PAYMENT TRANSACTION DATA REPRESENTING A CURRENT BILL PAYMENT TRANSACTION BEING REQUESTED THROUGH THE BILL PAYMENT SYSTEM BY A USER OF THE CURRENT BILL PAYMENT TRANSACTION OPERATION 219

In one embodiment, at RECEIVE CURRENT BILL PAYMENT TRANSACTION DATA REPRESENTING A CURRENT BILL PAYMENT TRANSACTION BEING REQUESTED THROUGH THE BILL PAYMENT SYSTEM BY A USER OF THE CURRENT BILL PAYMENT TRANSACTION OPERATION 219, current bill payment transaction data is received representing a current bill payment transaction being requested through the bill payment system by a user of the bill payment system of PROVIDE A BILL PAYMENT SYSTEM USING ONE OR MORE COMPUTING SYSTEMS OPERATION 203.

In one embodiment, once current bill payment transaction data is received representing a current bill payment transaction being requested through the bill payment system by a user of the bill payment system of PROVIDE A BILL PAYMENT SYSTEM USING ONE OR MORE COMPUTING SYSTEMS OPERATION 203 at RECEIVE CURRENT BILL PAYMENT TRANSACTION DATA REPRESENTING A CURRENT BILL PAYMENT TRANSACTION BEING REQUESTED THROUGH THE BILL PAYMENT SYSTEM BY A USER OF THE CURRENT BILL PAYMENT TRANSACTION OPERATION 219, process flow proceeds to BEFORE ALLOWING THE CURRENT BILL PAYMENT TRANSACTION, PROVIDING THE CURRENT BILL PAYMENT TRANSACTION DATA TO THE POTENTIAL FRAUDULENT BILL PAYMENT TRANSACTION SCORING ENGINE FOR ANALYSIS OPERATION 221

In one embodiment, at BEFORE ALLOWING THE CURRENT BILL PAYMENT TRANSACTION, PROVIDING THE CURRENT BILL PAYMENT TRANSACTION DATA TO THE POTENTIAL FRAUDULENT BILL PAYMENT TRANSACTION SCORING ENGINE FOR ANALYSIS OPERATION 221 before allowing the current bill payment transaction to be conducted, the current bill payment transaction data of RECEIVE CURRENT BILL PAYMENT TRANSACTION DATA REPRESENTING A CURRENT BILL PAYMENT TRANSACTION BEING REQUESTED THROUGH THE BILL PAYMENT SYSTEM BY A USER OF THE CURRENT BILL PAYMENT TRANSACTION OPERATION 219 is provided to the potential fraudulent bill payment transaction scoring engine of USE THE POTENTIAL FRAUDULENT BILL PAYMENT TRANSACTION SCORING PARAMETERS DATA TO CREATE A POTENTIAL FRAUDULENT BILL PAYMENT TRANSACTION SCORING ENGINE FOR ASSIGNING A POTENTIAL FRAUDULENT BILL PAYMENT TRANSACTION SCORE TO PROVIDED CURRENT BILL PAYMENT TRANSACTION DATA OPERATION 215 for analysis.

In one embodiment, once before allowing the current bill payment transaction to be conducted, the current bill payment transaction data of RECEIVE CURRENT BILL PAYMENT TRANSACTION DATA REPRESENTING A CURRENT BILL PAYMENT TRANSACTION BEING REQUESTED THROUGH THE BILL PAYMENT SYSTEM BY A USER OF THE CURRENT BILL PAYMENT TRANSACTION OPERATION 219 is provided to the potential fraudulent bill payment transaction scoring engine of USE THE POTENTIAL FRAUDULENT BILL PAYMENT TRANSACTION SCORING PARAMETERS DATA TO CREATE A POTENTIAL FRAUDULENT BILL PAYMENT TRANSACTION SCORING ENGINE FOR ASSIGNING A POTENTIAL FRAUDULENT BILL PAYMENT TRANSACTION SCORE TO PROVIDED CURRENT BILL PAYMENT TRANSACTION DATA OPERATION 215 for analysis at BEFORE ALLOWING THE CURRENT BILL PAYMENT TRANSACTION, PROVIDING THE CURRENT BILL PAYMENT TRANSACTION DATA TO THE POTENTIAL FRAUDULENT BILL PAYMENT TRANSACTION SCORING ENGINE FOR ANALYSIS OPERATION 221, process flow proceeds to DETERMINE A POTENTIAL FRAUDULENT BILL PAYMENT TRANSACTION SCORE VALUE TO BE ASSOCIATED WITH THE CURRENT BILL PAYMENT TRANSACTION OPERATION 223

In one embodiment, at DETERMINE A POTENTIAL FRAUDULENT BILL PAYMENT TRANSACTION SCORE VALUE TO BE ASSOCIATED WITH THE CURRENT BILL PAYMENT TRANSACTION OPERATION 223 a potential fraudulent bill payment transaction score value to be associated with the current bill payment transaction data of RECEIVE CURRENT BILL PAYMENT TRANSACTION DATA REPRESENTING A CURRENT BILL PAYMENT TRANSACTION BEING REQUESTED THROUGH THE BILL PAYMENT SYSTEM BY A USER OF THE CURRENT BILL PAYMENT TRANSACTION OPERATION 219 is determined, based, at least in part, on the analysis of the current bill payment transaction data by the potential fraudulent bill payment transaction scoring engine of USE THE POTENTIAL FRAUDULENT BILL PAYMENT TRANSACTION SCORING PARAMETERS DATA TO CREATE A POTENTIAL FRAUDULENT BILL PAYMENT TRANSACTION SCORING ENGINE FOR ASSIGNING A POTENTIAL FRAUDULENT BILL PAYMENT TRANSACTION SCORE TO PROVIDED CURRENT BILL PAYMENT TRANSACTION DATA OPERATION 215.

In one embodiment, once a potential fraudulent bill payment transaction score value to be associated with the current bill payment transaction data of RECEIVE CURRENT BILL PAYMENT TRANSACTION DATA REPRESENTING A CURRENT BILL PAYMENT TRANSACTION BEING REQUESTED THROUGH THE BILL PAYMENT SYSTEM BY A USER OF THE CURRENT BILL PAYMENT TRANSACTION OPERATION 219 is determined, based, at least in part, on the analysis of the current bill payment transaction data by the potential fraudulent bill payment transaction scoring engine of USE THE POTENTIAL FRAUDULENT BILL PAYMENT TRANSACTION SCORING PARAMETERS DATA TO CREATE A POTENTIAL FRAUDULENT BILL PAYMENT TRANSACTION SCORING ENGINE FOR ASSIGNING A POTENTIAL FRAUDULENT BILL PAYMENT TRANSACTION SCORE TO PROVIDED CURRENT BILL PAYMENT TRANSACTION DATA OPERATION 215 at DETERMINE A POTENTIAL FRAUDULENT BILL PAYMENT TRANSACTION SCORE VALUE TO BE ASSOCIATED WITH THE CURRENT BILL PAYMENT TRANSACTION OPERATION 223, process flow proceeds to BASED, AT LEAST IN PART, ON THE POTENTIAL FRAUDULENT BILL PAYMENT TRANSACTION SCORE VALUE ASSOCIATED WITH THE CURRENT BILL PAYMENT TRANSACTION DATA, TAKING ONE OF THE FOLLOWING ACTIONS: PREVENTING THE CURRENT BILL PAYMENT TRANSACTION; PLACING A HOLD ON THE CURRENT BILL PAYMENT TRANSACTION; AND ALLOWING THE CURRENT BILL PAYMENT TRANSACTION OPERATION 225.

In one embodiment, at BASED, AT LEAST IN PART, ON THE POTENTIAL FRAUDULENT BILL PAYMENT TRANSACTION SCORE VALUE ASSOCIATED WITH THE CURRENT BILL PAYMENT TRANSACTION DATA, TAKING ONE OF THE FOLLOWING ACTIONS: PREVENTING THE CURRENT BILL PAYMENT TRANSACTION; PLACING A HOLD ON THE CURRENT BILL PAYMENT TRANSACTION; AND ALLOWING THE CURRENT BILL PAYMENT TRANSACTION OPERATION 225 based, at least in part, on the potential fraudulent bill payment transaction score value associated with the current bill payment transaction data at DETERMINE A POTENTIAL FRAUDULENT BILL PAYMENT TRANSACTION SCORE VALUE TO BE ASSOCIATED WITH THE CURRENT BILL PAYMENT TRANSACTION OPERATION 223, one of the following actions is taken.

The current bill payment transaction represented by the current bill payment transaction of RECEIVE CURRENT BILL PAYMENT TRANSACTION DATA REPRESENTING A CURRENT BILL PAYMENT TRANSACTION BEING REQUESTED THROUGH THE BILL PAYMENT SYSTEM BY A USER OF THE CURRENT BILL PAYMENT TRANSACTION OPERATION 219 is prevented/stopped. In one embodiment, the current bill payment transaction is then investigated manually by one or more members of a fraud detection and prevention inspection team, and/or a fraud detection and prevention inspection system.

A hold is placed on the current bill payment transaction represented by the current bill payment transaction of RECEIVE CURRENT BILL PAYMENT TRANSACTION DATA REPRESENTING A CURRENT BILL PAYMENT TRANSACTION BEING REQUESTED THROUGH THE BILL PAYMENT SYSTEM BY A USER OF THE CURRENT BILL PAYMENT TRANSACTION OPERATION 219 until the current bill payment transaction is authorized through a bill payment transaction inspection system. In one embodiment, the current bill payment transaction is investigated manually by one or more members of a fraud detection and prevention inspection team, and/or a fraud detection and prevention inspection system, and, if the current bill payment transaction is deemed not to be fraudulent, the current bill payment transaction is allowed to be processed.

The current bill payment transaction represented by the current bill payment transaction of RECEIVE CURRENT BILL PAYMENT TRANSACTION DATA REPRESENTING A CURRENT BILL PAYMENT TRANSACTION BEING REQUESTED THROUGH THE BILL PAYMENT SYSTEM BY A USER OF THE CURRENT BILL PAYMENT TRANSACTION OPERATION 219 is allowed.

In one embodiment, once based, at least in part, on the potential fraudulent bill payment transaction score value associated with the current bill payment transaction data of DETERMINE A POTENTIAL FRAUDULENT BILL PAYMENT TRANSACTION SCORE VALUE TO BE ASSOCIATED WITH THE CURRENT BILL PAYMENT TRANSACTION OPERATION 223, action is taken at BASED, AT LEAST IN PART, ON THE POTENTIAL FRAUDULENT BILL PAYMENT TRANSACTION SCORE VALUE ASSOCIATED WITH THE CURRENT BILL PAYMENT TRANSACTION DATA, TAKING ONE OF THE FOLLOWING ACTIONS: PREVENTING THE CURRENT BILL PAYMENT TRANSACTION; PLACING A HOLD ON THE CURRENT BILL PAYMENT TRANSACTION; AND ALLOWING THE CURRENT BILL PAY- MENT TRANSACTION OPERATION 225, process flow proceeds to process flow proceeds to EXIT OPERATION 240.

In one embodiment, at EXIT OPERATION 240 process 200 for detecting fraudulent bill payment transactions using dynamic multi-parameter predictive modeling is exited to await new data.

In one embodiment, the operations of: COLLECT HISTORICAL BILL PAYMENT TRANSACTION DATA OPERATION 205; IDENTIFY HISTORICAL FRAUDULENT BILL PAYMENT TRANSACTIONS OPERATION 207; OBTAIN HISTORICAL FRAUDULENT BILL PAYMENT TRANSACTIONS DATA OPERATION 209; and PROCESS THE HISTORICAL FRAUDULENT BILL PAYMENT TRANSACTIONS DATA USING ONE OR MORE MACHINE LEARNING ALGORITHMS OF A FRAUDULENT ACTIVITY PREDICTIVE MODEL OPERATION 211 are performed on a periodic basis to dynamically update the potential fraudulent bill payment transaction scoring parameters data of USE THE FRAUDULENT ACTIVITY PREDICTIVE MODEL TO GENERATE POTENTIAL FRAUDULENT BILL PAYMENT TRANSACTION SCORING PARAMETERS DATA OPERATION 213 on a periodic basis. In this way, a self-learning process 200 for detecting fraudulent bill payment transactions using dynamic multi-parameter predictive modeling is created and maintained.

Figure 3:
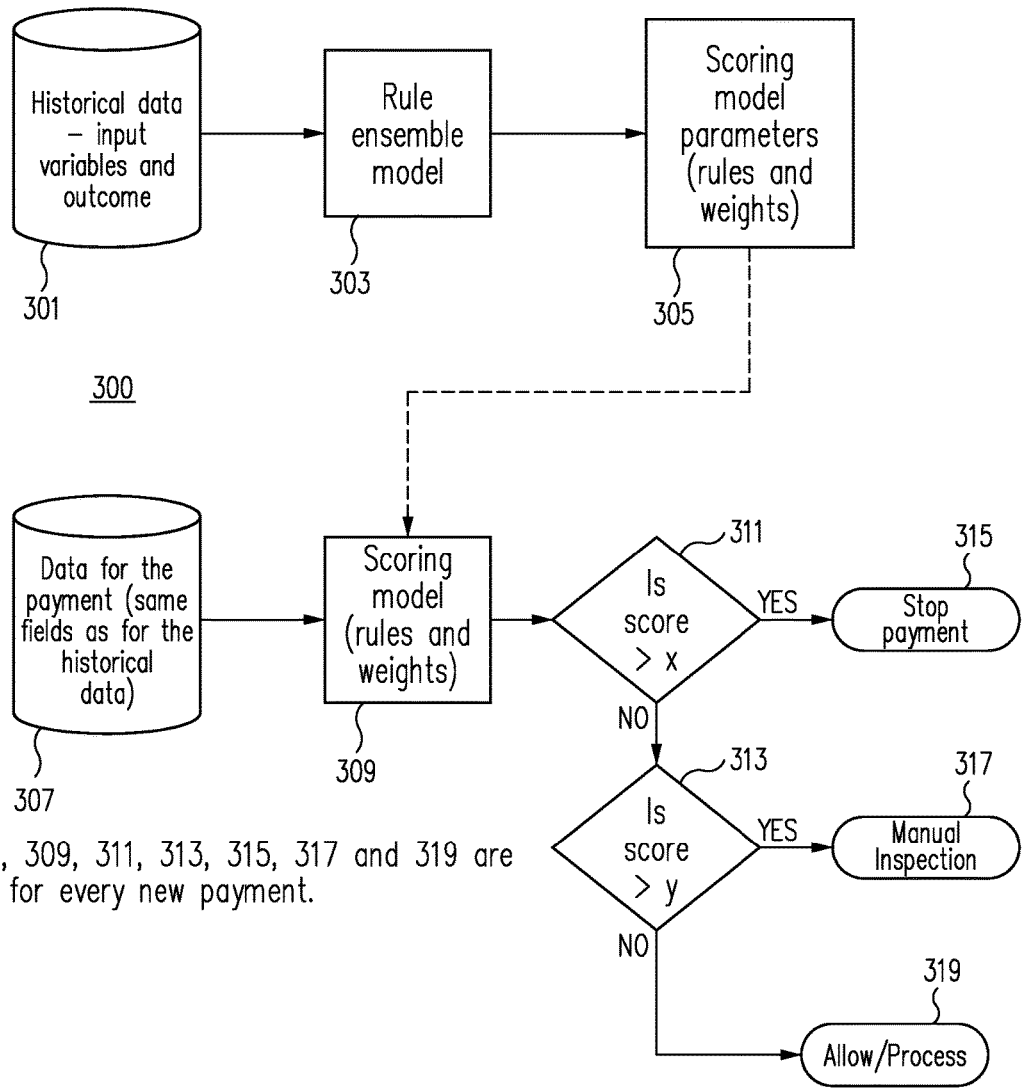
FIG. 3 is a function block flow diagram representing one example of a generalized process for detecting fraudulent bill payment transactions using an ensemble method/model of predictive modeling, in accordance with one embodiment.

FIG. 3 is a function block flow diagram representing one example of a generalized process 300 for detecting fraudulent bill payment transactions using an ensemble method/model of predictive modeling, in accordance with one embodiment.

As seen in FIG. 3, process 300 for detecting fraudulent bill payment transactions using an ensemble method/model of predictive modeling includes historical data—input variables and outcome database 301 including historical bill payment transaction data and historical fraudulent bill payment transactions data.

In one embodiment, the historical bill payment transaction data and historical fraudulent bill payment transactions data of historical data—input variables and outcome database 301 is processed using rule ensemble model 303 that includes machine learning algorithms. In one embodiment, rule ensemble model 303 is used to generate scoring model parameters (rules and weights) 305 including potential fraudulent bill payment transaction scoring parameters data (not shown).

In one embodiment, the potential fraudulent bill payment transaction scoring parameters data (not shown) of scoring model parameters (rules and weights) 305 is used to create scoring model (rules and weights) 309, e.g., a potential fraudulent bill payment transaction scoring engine.

In one embodiment, data for the payment (same fields as for the historical data) 307 includes current bill payment transaction data representing a current bill payment transaction being requested through the bill payment system by a user of the current bill payment transaction. In one embodiment, before allowing the current bill payment transaction represented in data for the payment (same fields as for the historical data) 307 to be conducted, the current bill payment transaction represented in data for the payment (same fields as for the historical data) 307 is provided to scoring model (rules and weights) 309.

In one embodiment, scoring model (rules and weights) 309 analyses the current bill payment transaction data of data for the payment (same fields as for the historical data) 307 and assigns a potential fraudulent bill payment transaction score value data (not shown) to the current bill payment transaction data of data for the payment (same fields as for the historical data) 307.

In one embodiment of process 300 for detecting fraudulent bill payment transactions using an ensemble method/model of predictive modeling, two threshold potential fraudulent bill payment transaction score values are defined and threshold potential fraudulent bill payment transaction score value data is generated representing the two threshold potential fraudulent bill payment transaction score values.

In one embodiment, the two threshold potential fraudulent bill payment transaction score values include a first threshold potential fraudulent bill payment transaction score value (X) and a second threshold potential fraudulent bill payment transaction score value (Y). In one embodiment, the first and second threshold potential fraudulent bill payment transaction score values are defined such that: if a potential fraudulent bill payment transaction score value data assigned to the current bill payment transaction data of data for the payment (same fields as for the historical data) 307 is greater than the first defined threshold potential fraudulent bill payment transaction score value (X), the current bill payment transaction represented by the current bill payment transaction data is prevented; if a potential fraudulent bill payment transaction score value data assigned to the current bill payment transaction data of data for the payment (same fields as for the historical data) 307 is less than the first defined threshold potential fraudulent bill payment transaction score value (X) and greater than the second threshold potential fraudulent bill payment transaction score value (Y), the current bill payment transaction represented by the current bill payment transaction data is put on hold; and if a potential fraudulent bill payment transaction score value data assigned to the current bill payment transaction data of data for the payment (same fields as for the historical data) 307 is less than the second defined threshold potential fraudulent bill payment transaction score value (Y), the current bill payment transaction represented by the current bill payment transaction data is allowed.

As seen in FIG. 3, based, at least in part, on the potential fraudulent bill payment transaction score value associated with the current bill payment transaction data of data for the payment (same fields as for the historical data) 307, one of the following actions is taken.

If the potential fraudulent bill payment transaction score value data assigned to the current bill payment transaction data of data for the payment (same fields as for the historical data) 307 is determined to be greater than the first defined threshold potential fraudulent bill payment transaction score value (X) at is score >X 311, the current bill payment transaction represented by the current bill payment transaction data is prevented at stop payment 315.

If the potential fraudulent bill payment transaction score value data assigned to the current bill payment transaction data of data for the payment (same fields as for the historical data) 307 is determined to be less than the first defined threshold potential fraudulent bill payment transaction score value (X) and greater than the second threshold potential fraudulent bill payment transaction score value (Y) at is score >Y 313, the current bill payment transaction represented by the current bill payment transaction data is put on hold at manual inspection 317.

If the potential fraudulent bill payment transaction score value data assigned to the current bill payment transaction data of data for the payment (same fields as for the historical data) 307 is determined to be less than the second defined threshold potential fraudulent bill payment transaction score value (Y) at score value (Y) at is score >Y, the current bill payment transaction represented by the current bill payment transaction data is allowed at allow/process 319.

Using the disclosed embodiments of processes 200 and 300 for detecting fraudulent bill payment transactions using dynamic multi-parameter predictive modeling, a method and system for detecting fraudulent bill payment transactions more accurately is provided. Therefore, the disclosed embodiments provide a technical solution to the long standing technical problem of inaccurate fraudulent bill payment transaction detection.

In addition, processes 200 and 300 for detecting fraudulent bill payment transactions using dynamic multi-parameter predictive modeling are also capable of self-learning and dynamically adapting to new data and/or a changing threat environment. Consequently, processes 200 and 300 for detecting fraudulent bill payment transactions using dynamic multi-parameter predictive modeling also provide a technical solution to the long standing technical problem of static and inflexible fraudulent bill payment transaction detection.

The result is a much more accurate, adaptable, and robust, method and system to detect potentially fraudulent bill payment transactions that not only is more effective at detecting fraudulent bill payment transactions, but thereby serves to bolster confidence in the processing of all bill payment transactions. This, in turn, results in: less human and processor resources being dedicated to processing bill payment transactions incorrectly designated potentially fraudulent bill payment transactions, i.e., fewer false positives having to be processed and/or investigated; less memory and storage bandwidth being dedicated to buffering and storing bill payment transactions incorrectly designated potentially fraudulent bill payment transactions, i.e., fewer false positives having to be stored while they await further analysis; less communication bandwidth being utilized to transmit bill payment transactions incorrectly designated potentially fraudulent bill payment transactions, i.e., fewer false positives being passed around between various investigating parties and systems.

In addition, using processes 200 and 300 for detecting fraudulent bill payment transactions using dynamic multi-parameter predictive modeling, a self-learning and dynamically adaptive method and system for detecting fraudulent bill payment service transactions is provided that, once deployed, is self-correcting and can be customized to new conditions/parameters without the need for new coding, patches, or a new version release. Consequently, using the disclosed embodiments of processes 200 and 300 for detecting fraudulent bill payment transactions using dynamic multi-parameter predictive modeling, high value resources, such coder, engineer, and scientist time and energy, are conserved since there is no need for reactive deployments of new code and new versions each time parameters, and/or the operating/threat environment, change.

The disclosed method and system for detecting fraudulent bill payment transactions using dynamic multi-parameter predictive modeling does not encompass, embody, or preclude other forms of innovation in the area of fraudulent bill pay transaction detection or processing. In addition, the disclosed method and system for detecting fraudulent bill payment transactions using dynamic multi-parameter predictive modeling is not related to any fundamental economic practice, fundamental data processing practice, mental steps, or pen and paper based solutions, and is, in fact, directed to providing self-learning loop/tree, multi-parameter, predictive modeling based solutions to the relatively new problems associated with the processing of electronic bill payments through a bill payment service/system. Consequently, the disclosed method and system for detecting fraudulent bill payment transactions using dynamic multi-parameter predictive modeling is not directed to, does not encompass, and is not merely, an abstract idea or concept.

In addition, the disclosed method and system for detecting fraudulent bill payment transactions using dynamic multi-parameter predictive modeling provides for significant improvements to the technical fields of electronic transaction security and fraud prevention, electronic transaction data processing, financial transaction processing, information dissemination, data processing, data management, and user experience.

In addition, as discussed above, the disclosed method and system for detecting fraudulent bill payment transactions using dynamic multi-parameter predictive modeling provides for the entry, processing, and dissemination, of only relevant portions of data, i.e., more accurately identified potentially fraudulent bill payment transaction data; thereby eliminating unnecessary data analysis and correction before resources are allocated to processing, and/or correcting, faulty data, and/or the faulty data is further transmitted/distributed. Consequently, using the disclosed method and system for detecting fraudulent bill payment transactions using dynamic multi-parameter predictive modeling results in more efficient use of human and non-human resources, fewer processor cycles being utilized, reduced memory utilization, and less communications bandwidth being utilized to relay data to, and from, backend systems and client systems, and various investigative systems and parties. As a result, computing systems are transformed into faster, more efficient, and more effective computing systems by implementing the method and system for detecting fraudulent bill payment transactions using dynamic multi-parameter predictive modeling.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein, are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "generating," "determining," "taking action," "accessing," "analyzing," "obtaining," "identifying," "designating," "categorizing," "receiving," "transmitting," "implementing," "associating," "aggregating," "initiating," "collecting," "creating," "transferring," "storing," "searching," "comparing," "providing," "processing" etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes by a computer program stored via a computer program product as defined herein that can be accessed by a computing system or other device to transform the computing system or other device into a specifically and specially programmed computing system or other device.

Those of skill in the art will readily recognize that the algorithms and operations presented herein are not inherently related to any particular computing system, computer architecture, computer or industry standard, or any other specific apparatus. It may prove convenient/efficient to construct or transform one or more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar and/or dissimilar computers and storage devices over a private network, a LAN, a WAN, a private network, or a public network, such as the Internet.

It should also be noted that the language used in the specification has been principally selected for readability, clarity, and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIGS. are identified using a particular nomenclature for ease of description and understanding, but other nomenclature is often used in the art to identify equivalent operations.

In the discussion above, certain aspects of one embodiment include process steps and/or operations and/or instructions described herein for illustrative purposes in a particular order and/or grouping. However, the particular order and/or grouping shown and discussed herein is illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein does not limit the scope of the invention as claimed below.

Therefore, numerous variations, whether explicitly provided for by the specification or implied by the specification or not, may be implemented by one of skill in the art in view of this disclosure.

What is claimed is:

1. A method for detecting fraudulent bill payment transactions using dynamic multi-parameter predictive modeling, the method comprising:

collecting historical bill payment transaction data representing bill payment transactions conducted through a bill payment system;

obtaining historical fraudulent bill payment transactions data representing historical fraudulent bill payment transactions;

processing the obtained historical fraudulent bill payment transactions data using one or more machine learning algorithms and identifying fraudulent bill payment parameters, the fraudulent bill payment parameters including rules evidencing common characteristics associated with individual fraudulent transactions of the historical bill payment transactions data;

generate fraudulent bill payment transaction scoring parameters data representing the identified fraudulent bill payment rules;

using the fraudulent bill payment transaction scoring parameters data to create a fraudulent bill payment transaction scoring engine, the fraudulent bill payment transaction scoring engine assigning a fraudulent bill payment transaction score to current bill payment transaction data representing a current bill payment transaction, the fraudulent bill payment transaction score being based, at least in part, on analysis of one or more interconnected fraudulent bill payment parameters identified in the current bill payment transaction and the fraudulent bill payment transaction scoring parameters data;

defining one or more threshold fraudulent bill payment transaction score values;

generating threshold fraudulent bill payment transaction score value data representing the one or more threshold fraudulent bill payment transaction score values;

receiving current bill payment transaction data representing a current bill payment transaction being requested through the bill payment system by a user of the current bill payment transaction;

before allowing the current bill payment transaction, providing the current bill payment transaction data to the fraudulent bill payment transaction scoring engine for analysis;

determining a fraudulent bill payment transaction score value to be associated with the current bill payment transaction data, based, at least in part, on the analysis of the current bill payment transaction data by the fraudulent bill payment transaction scoring engine; and based, at least in part, on an analysis of the fraudulent bill payment transaction score value data associated with the current bill payment transaction data and the threshold fraudulent bill payment transaction score value data, taking one of the following actions:
  preventing the current bill payment from being completed;
  placing a hold on the current bill payment transaction by forwarding the current bill payment transaction data to a bill payment transaction inspection system and not forwarding and/or allowing the current bill payment transaction to the payee until the current bill payment transaction is authorized through the bill payment transaction inspection system; and
  allowing the current bill payment transaction to be completed;

updating, on a recurring basis, the historical fraudulent bill payment transactions data and recurringly processing the obtained historical fraudulent bill payment transactions data using one or more machine learning algorithms of a fraudulent activity predictive model and identifying one or more new fraudulent bill payment parameters, the fraudulent bill payment parameters including new rules evidencing common characteristics associated with individual fraudulent transactions of the updated historical bill payment transactions data and generating fraudulent bill payment transaction scoring parameters data representing the identified new fraudulent bill payment rules.

2. The method for detecting fraudulent bill payment transactions using dynamic multi-parameter predictive modeling of claim 1 wherein the bill payment system is a bill payment system selected from the group of bill payment systems consisting of:
  a computing system implemented bill payment system;
  an online bill payment system; and
  the MintBills bill payment system.

3. The method for detecting fraudulent bill payment transactions using dynamic multi-parameter predictive modeling of claim 1 further comprising repeating:
  collecting historical bill payment transaction data representing bill payment transactions conducted through the bill payment system;
  identifying historical fraudulent bill payment transactions;
  obtaining historical fraudulent bill payment transactions data representing the historical fraudulent bill payment transactions; and
  processing the historical fraudulent bill payment transactions data using one or more machine learning algorithms of a fraudulent activity predictive model, on a periodic basis to dynamically update the fraudulent bill payment transaction scoring parameters data on a periodic basis to create a self-learning method for detecting fraudulent bill payment transactions using dynamic multi-parameter predictive modeling.

4. The method for detecting fraudulent bill payment transactions using dynamic multi-parameter predictive modeling of claim 1 wherein the fraudulent bill payment transaction scoring parameters data is generated based, at least in part, on the values of one or more interconnected fraudulent activity parameter/rule input variables identified in the historical fraudulent bill payment transactions data, at least one of the one or more individual fraudulent activity parameter/rule input variables being selected from the group of individual fraudulent activity parameter/rule input variable types consisting of:
  personal data associated with the user of the bill payment system;
  account information data associated with the account being utilized;
  historical user data representing historical bill payment transactions made through the bill payment system; and
  current bill payment transaction details data.

5. The method for detecting fraudulent bill payment transactions using dynamic multi-parameter predictive modeling of claim 4 wherein the personal data associated with the user individual fraudulent activity parameter/rule input variable type includes at least one individual fraudulent activity parameter/rule input variable selected form the group of individual fraudulent activity parameter/rule input variables consisting of:
  the domain name of an email address associated with the user; and
  the zip code of an address associated with the user.

6. The method for detecting fraudulent bill payment transactions using dynamic multi-parameter predictive modeling of claim 4 wherein the account information data associated with the account being utilized individual fraudulent activity parameter/rule input variable type includes at least one individual fraudulent activity parameter/rule input variable selected form the group of individual fraudulent activity parameter/rule input variables consisting of:
  a creation timestamp indicating when the user's account was created;
  a day of week obtained from the creation timestamp;
  an hour of day obtained from the creation timestamp;
  a day of month obtained from the creation timestamp;
  a month obtained from the creation timestamp;
  a year obtained from the creation timestamp;
  the number of anonymous provider/biller accounts;
  the number of anonymous ACH/bank accounts;
  the number of anonymous credit cards;
  the number of linked provider/biller accounts;
  the number of linked ACH/bank accounts; and
  the number of linked credit cards.

7. The method for detecting fraudulent bill payment transactions using dynamic multi-parameter predictive modeling of claim 4 wherein the historical user data representing historical bill payment transactions made through the bill payment system individual fraudulent activity parameter/rule input variable type includes at least one individual fraudulent activity parameter/rule input variable selected form the group of individual fraudulent activity parameter/rule input variables consisting of:
  number of logins to a mobile bill pay system application;
  number of distinct IP addresses used when logging into a mobile bill pay system application;
  number of logins to the bill pay system;
  number of distinct IP addresses used when logging into the bill pay system;
  number of logins to a web application associated with the bill pay system;
  number of distinct IP addresses used when logging into a web application associated with the bill pay system;

number of logins to other applications;
number of distinct IP addresses used when logging into other applications;
number of payments classified as "good funds with error;"
total amount of payments classified as "good funds with error;"
fees associated with payments classified as "good funds with error;"
number of payments classified as fraud;
total amount of payments classified as fraud;
fees associated with payments classified as fraud;
number of payments resulting in money owed;
total amount of payments resulting in money owed;
fees associated with payments resulting in money owed;
number of payments processed successfully;
total amount of payments processed successfully; and
fees associated with payments processed successfully.

8. The method for detecting fraudulent bill payment transactions using dynamic multi-parameter predictive modeling of claim 4 wherein the current bill payment transaction details data individual fraudulent activity parameter/rule input variable type includes at least one individual fraudulent activity parameter/rule input variable selected form the group of individual fraudulent activity parameter/rule input variables consisting of:
whether for the current bill payment transaction, the payment method is anonymous;
whether for the current bill payment transaction, the biller anonymous;
when the current bill payment transaction was created;
the amount of the current bill payment transaction;
the fee associated with the current bill payment transaction;
the category of the biller/payee; and
whether for the current bill payment transaction the payment method is a credit card or bank account.

9. The method for detecting fraudulent bill payment transactions using dynamic multi-parameter predictive modeling of claim 1 wherein the fraudulent activity predictive model assigns interrelated weights to the one or more interconnected fraudulent bill payment parameters and/or combinations of the one or more interconnected fraudulent bill payment parameters identified in the historical fraudulent bill payment transactions data to generate fraudulent bill payment transaction scoring parameters data.

10. The method for detecting fraudulent bill payment transactions using dynamic multi-parameter predictive modeling of claim 1 wherein the one or more threshold fraudulent bill payment transaction score values include a first threshold fraudulent bill payment transaction score value and a second threshold fraudulent bill payment transaction score value, the first and second threshold fraudulent bill payment transaction score values being defined such that:
if a fraudulent bill payment transaction score value associated with a current bill payment transaction data is greater than the first defined threshold fraudulent bill payment transaction score value, the current bill payment transaction is prevented;
if a fraudulent bill payment transaction score value associated with a current bill payment transaction data is less than the first defined threshold fraudulent bill payment transaction score value and greater than the second threshold fraudulent bill payment transaction score value, the current bill payment transaction is put on hold; and
if a fraudulent bill payment transaction score value associated with a current bill payment transaction data is less than the second defined threshold fraudulent bill payment transaction score value, the current bill payment transaction is allowed.

11. A method for detecting fraudulent bill payment transactions using dynamic multi-parameter predictive modeling, the method comprising:
collecting historical bill payment transaction data representing bill payment transactions conducted through a bill payment system;
obtaining historical fraudulent bill payment transactions data representing historical fraudulent bill payment transactions;
processing the obtained historical fraudulent bill payment transactions data using one or more machine learning algorithms and identifying fraudulent bill payment parameters, the fraudulent bill payment parameters including rules evidencing common characteristics associated with individual fraudulent transactions of the historical bill payment transactions data;
generate fraudulent bill payment transaction scoring parameters data based, at least in part, on the values of one or more interconnected fraudulent activity parameter/rule input variables identified in the historical fraudulent bill payment transactions data representing the identified fraudulent bill payment rules;
using the fraudulent bill payment transaction scoring parameters data to create a fraudulent bill payment transaction scoring engine, the fraudulent bill payment transaction scoring engine assigning a fraudulent bill payment transaction score to provided current bill payment transaction data representing a current bill payment transaction, the fraudulent bill payment transaction score being based, at least in part, on analysis of one or more interconnected fraudulent bill payment parameters and/or the values of one or more interconnected fraudulent activity parameter/rule input variables identified in the current bill payment transaction and the one or more interconnected fraudulent bill payment parameters and/or the values of one or more interconnected fraudulent activity parameter/rule input variables identified in the historical fraudulent bill payment transactions data;
defining one or more threshold fraudulent bill payment transaction score values;
generating threshold fraudulent bill payment transaction score value data representing the one or more threshold fraudulent bill payment transaction score values;
receiving current bill payment transaction data representing a current bill payment transaction being requested through the bill payment system by a user of the current bill payment transaction;
before allowing the current bill payment transaction, providing the current bill payment transaction data to the fraudulent bill payment transaction scoring engine for analysis;
determining a fraudulent bill payment transaction score value to be associated with the current bill payment transaction data, based, at least in part, on the analysis of the current bill payment transaction data by the fraudulent bill payment transaction scoring engine; and
based, at least in part, on an analysis of the fraudulent bill payment transaction score value data associated with the current bill payment transaction data and the threshold fraudulent bill payment transaction score value data, taking one of the following actions:
not allowing the current bill payment transaction to be completed;

placing a hold on the current bill payment transaction by forwarding the current bill payment transaction data to a bill payment transaction inspection system and not forwarding and/or allowing the current bill payment transaction to the payee until the current bill payment transaction is authorized through the bill payment transaction inspection system; and allowing the current bill payment transaction be completed;

updating, on a recurring basis, the historical fraudulent bill payment transactions data and recurringly processing the obtained historical fraudulent bill payment transactions data using one or more machine learning algorithms of a fraudulent activity predictive model and identifying one or more new fraudulent bill payment parameters, the fraudulent bill payment parameters including new rules evidencing common characteristics associated with individual fraudulent transactions of the updated historical bill payment transactions data and generating fraudulent bill payment transaction scoring parameters data representing the identified new fraudulent bill payment rules.

12. The method for detecting fraudulent bill payment transactions using dynamic multi-parameter predictive modeling of claim 11 wherein the bill payment system is a bill payment system selected from the group of bill payment systems consisting of:

a computing system implemented bill payment system;

an online bill payment system; and the MintBills bill payment system.

13. The method for detecting fraudulent bill payment transactions using dynamic multi-parameter predictive modeling of claim 11 further comprising repeating:

collecting historical bill payment transaction data representing bill payment transactions conducted through the bill payment system;

identifying historical fraudulent bill payment transactions;

obtaining historical fraudulent bill payment transactions data representing the historical fraudulent bill payment transactions; and processing the historical fraudulent bill payment transactions data using one or more machine learning algorithms of a fraudulent activity predictive model, on a periodic basis to dynamically update the fraudulent bill payment transaction scoring parameters data on a periodic basis to create a self-learning method for detecting fraudulent bill payment transactions using dynamic multi-parameter predictive modeling.

14. The method for detecting fraudulent bill payment transactions using dynamic multi-parameter predictive modeling of claim 11 wherein at least one of the one or more individual fraudulent activity parameter/rule input variables is selected from the group of individual fraudulent activity parameter/rule input variable types consisting of:

personal data associated with the user of the bill payment system;

account information data associated with the account being utilized;

historical user data representing historical bill payment transactions made through the bill payment system; and current bill payment transaction details data.

15. The method for detecting fraudulent bill payment transactions using dynamic multi-parameter predictive modeling of claim 14 wherein the personal data associated with the user individual fraudulent activity parameter/rule input variable type includes at least one individual fraudulent activity parameter/rule input variable selected form the group of individual fraudulent activity parameter/rule input variables consisting of:

the domain name of an email address associated with the user; and the zip code of an address associated with the user.

16. The method for detecting fraudulent bill payment transactions using dynamic multi-parameter predictive modeling of claim 14 wherein the account information data associated with the account being utilized individual fraudulent activity parameter/rule input variable type includes at least one individual fraudulent activity parameter/rule input variable selected form the group of individual fraudulent activity parameter/rule input variables consisting of:

a creation timestamp indicating when the user's account was created;

a day of week obtained from the creation timestamp;

an hour of day obtained from the creation timestamp;

a day of month obtained from the creation timestamp;

a month obtained from the creation timestamp;

a year obtained from the creation timestamp;

the number of anonymous provider/biller accounts;

the number of anonymous ACH/bank accounts;

the number of anonymous credit cards;

the number of linked provider/biller accounts;

the number of linked ACH/bank accounts; and the number of linked credit cards.

17. The method for detecting fraudulent bill payment transactions using dynamic multi-parameter predictive modeling of claim 14 wherein the historical user data representing historical bill payment transactions made through the bill payment system individual fraudulent activity parameter/rule input variable type includes at least one individual fraudulent activity parameter/rule input variable selected form the group of individual fraudulent activity parameter/rule input variables consisting of:

number of logins to a mobile bill pay system application;

number of distinct IP addresses used when logging into a mobile bill pay system application;

number of logins to the bill pay system;

number of distinct IP addresses used when logging into the bill pay system;

number of logins to a web application associated with the bill pay system;

number of distinct IP addresses used when logging into a web application associated with the bill pay system;

number of logins to other applications;

number of distinct IP addresses used when logging into other applications;

number of payments classified as "good funds with error;"

total amount of payments classified as "good funds with error;"

fees associated with payments classified as "good funds with error;"

number of payments classified as fraud;

total amount of payments classified as fraud;

fees associated with payments classified as fraud;

number of payments resulting in money owed;

total amount of payments resulting in money owed;

fees associated with payments resulting in money owed;

number of payments processed successfully;

total amount of payments processed successfully; and fees associated with payments processed successfully.

18. The method for detecting fraudulent bill payment transactions using dynamic multi-parameter predictive modeling of claim 14 wherein the current bill payment transaction details data individual fraudulent activity parameter/ rule input variable type includes at least one individual fraudulent activity parameter/rule input variable selected form the group of individual fraudulent activity parameter/rule input variables consisting of:
  whether for the current bill payment transaction, the payment method is anonymous;
  whether for the current bill payment transaction, the biller anonymous;
  when the current bill payment transaction was created;
  the amount of the current bill payment transaction;
  the fee associated with the current bill payment transaction;
  the category of the biller/payee; and
  whether for the current bill payment transaction the payment method is a credit card or bank account.

19. The method for detecting fraudulent bill payment transactions using dynamic multi-parameter predictive modeling of claim 11 wherein the fraudulent activity ensemble method model assigns interrelated weights to the one or more interconnected fraudulent bill payment parameters and/or combinations of the one or more interconnected fraudulent bill payment parameters identified in the historical fraudulent bill payment transactions data to generate fraudulent bill payment transaction scoring parameters data.

20. The method for detecting fraudulent bill payment transactions using dynamic multi-parameter predictive modeling of claim 11 wherein the one or more threshold fraudulent bill payment transaction score values include a first threshold fraudulent bill payment transaction score value and a second threshold fraudulent bill payment transaction score value, the first and second threshold fraudulent bill payment transaction score values being defined such that:
  if a fraudulent bill payment transaction score value associated with a current bill payment transaction data is greater than the first defined threshold fraudulent bill payment transaction score value, the current bill payment transaction is prevented;
  if a fraudulent bill payment transaction score value associated with a current bill payment transaction data is less than the first defined threshold fraudulent bill payment transaction score value and greater than the second threshold fraudulent bill payment transaction score value, the current bill payment transaction is put on hold; and
  if a fraudulent bill payment transaction score value associated with a current bill payment transaction data is less than the second defined threshold fraudulent bill payment transaction score value, the current bill payment transaction is allowed.

21. A method for detecting fraudulent bill payment transactions using dynamic multi-parameter predictive modeling comprising:
  providing a bill payment system using one or more computing systems;
  obtaining historic bill payment transaction data;
  identifying historical fraudulent bill payment transaction data in the historical bill payment transactions data;
  processing the historical fraudulent bill payment transactions data using one or more processors and one or more machine learning algorithms of an ensemble method model and/or a regression and classification fraudulent activity model;
  generating fraudulent bill payment transaction scoring parameters data based on the analysis of the historical fraudulent bill payment transactions data using the one or more processors and one or more machine learning algorithms of the ensemble method model and/or a regression and classification fraudulent activity model and identifying fraudulent bill payment parameters, the fraudulent bill payment parameters including rules evidencing common characteristics associated with individual fraudulent transactions of the historical bill payment transactions data;
  creating a fraudulent bill payment transaction scoring engine using the fraudulent bill payment transaction scoring parameters data;
  generating threshold fraudulent bill payment transaction score value data representing one or more defined threshold fraudulent bill payment transaction score values;
  receiving current bill payment transaction data representing a current bill payment transaction being requested through the bill payment system by a user of the current bill payment transaction;
  before allowing the current bill payment transaction to be conducted, providing the current bill payment transaction data to the fraudulent bill payment transaction scoring engine for analysis;
  based, at least in part, on the analysis of the current bill payment transaction data by the fraudulent bill payment transaction scoring engine determining and assigning fraudulent bill payment transaction score value data to the current bill payment transaction data; and
  based, at least in part, on an analysis of the fraudulent bill payment transaction score value data associated with the current bill payment transaction data and the threshold fraudulent bill payment transaction score value data, taking one of the following actions:
    preventing the current bill payment transaction represented by the current bill payment transaction data from being completed;
    placing a hold on the current bill payment transaction represented by the current bill payment transaction data; and
    allowing the current bill payment transaction represented by the current bill payment transaction data to be completed;
  updating, on a recurring basis, the historical fraudulent bill payment transactions data and recurringly processing the obtained historical fraudulent bill payment transactions data using one or more machine learning algorithms of a fraudulent activity predictive model and identifying one or more new fraudulent bill payment parameters, the fraudulent bill payment parameters including new rules evidencing common characteristics associated with individual fraudulent transactions of the updated historical bill payment transactions data and generating fraudulent bill payment transaction scoring parameters data representing the identified new fraudulent bill payment rules.

22. The method for detecting fraudulent bill payment transactions using dynamic multi-parameter predictive modeling of claim 21 wherein the bill payment system is a bill payment system selected from the group of bill payment systems consisting of:
  a computing system implemented bill payment system;
  an online bill payment system; and
  the MintBills bill payment system.

23. The method for detecting fraudulent bill payment transactions using dynamic multi-parameter predictive modeling of claim 21 further comprising repeating:
  obtaining historic bill payment transaction data;
  identifying historical fraudulent bill payment transaction data in the historical bill payment transactions data;

processing the historical fraudulent bill payment transactions data using one or more processors and one or more machine learning algorithms of an ensemble method model and/or a regression and classification fraudulent activity model; and generating fraudulent bill payment transaction scoring parameters data based on the analysis of the historical fraudulent bill payment transactions data using the one or more processors and one or more machine learning algorithms of the ensemble method model and/or a regression and classification fraudulent activity model on a periodic basis to dynamically update the fraudulent bill payment transaction scoring parameters data on a periodic basis to create a self-learning method for detecting fraudulent bill payment transactions using dynamic multi-parameter predictive modeling.

24. The method for detecting fraudulent bill payment transactions using dynamic multi-parameter predictive modeling of claim 21 wherein at least one of the one or more individual fraudulent activity parameter/rule input variables is selected from the group of individual fraudulent activity parameter/rule input variable types consisting of:
personal data associated with the user of the bill payment system;
account information data associated with the account being utilized;
historical user data representing historical bill payment transactions made through the bill payment system; and
current bill payment transaction details data.

25. The method for detecting fraudulent bill payment transactions using dynamic multi-parameter predictive modeling of claim 24 wherein the personal data associated with the user individual fraudulent activity parameter/rule input variable type includes at least one individual fraudulent activity parameter/rule input variable selected form the group of individual fraudulent activity parameter/rule input variables consisting of:
the domain name of an email address associated with the user; and
the zip code of an address associated with the user.

26. The method for detecting fraudulent bill payment transactions using dynamic multi-parameter predictive modeling of claim 24 wherein the account information data associated with the account being utilized individual fraudulent activity parameter/rule input variable type includes at least one individual fraudulent activity parameter/rule input variable selected form the group of individual fraudulent activity parameter/rule input variables consisting of:
a creation timestamp indicating when the user's account was created;
a day of week obtained from the creation timestamp;
an hour of day obtained from the creation timestamp;
a day of month obtained from the creation timestamp;
a month obtained from the creation timestamp;
a year obtained from the creation timestamp;
the number of anonymous provider/biller accounts;
the number of anonymous ACH/bank accounts;
the number of anonymous credit cards;
the number of linked provider/biller accounts;
the number of linked ACH/bank accounts; and
the number of linked credit cards.

27. The method for detecting fraudulent bill payment transactions using dynamic multi-parameter predictive modeling of claim 24 wherein the historical user data representing historical bill payment transactions made through the bill payment system individual fraudulent activity parameter/rule input variable type includes at least one individual fraudulent activity parameter/rule input variable selected form the group of individual fraudulent activity parameter/rule input variables consisting of:
number of logins to a mobile bill pay system application;
number of distinct IP addresses used when logging into a mobile bill pay system application;
number of logins to the bill pay system;
number of distinct IP addresses used when logging into the bill pay system;
number of logins to a web application associated with the bill pay system;
number of distinct IP addresses used when logging into a web application associated with the bill pay system;
number of logins to other applications;
number of distinct IP addresses used when logging into other applications;
number of payments classified as "good funds with error;"
total amount of payments classified as "good funds with error;"
fees associated with payments classified as "good funds with error;"
number of payments classified as fraud;
total amount of payments classified as fraud;
fees associated with payments classified as fraud;
number of payments resulting in money owed;
total amount of payments resulting in money owed;
fees associated with payments resulting in money owed;
number of payments processed successfully;
total amount of payments processed successfully; and
fees associated with payments processed successfully.

28. The method for detecting fraudulent bill payment transactions using dynamic multi-parameter predictive modeling of claim 24 wherein the current bill payment transaction details data individual fraudulent activity parameter/rule input variable type includes at least one individual fraudulent activity parameter/rule input variable selected form the group of individual fraudulent activity parameter/rule input variables consisting of:
whether for the current bill payment transaction, the payment method is anonymous;
whether for the current bill payment transaction, the biller anonymous;
when the current bill payment transaction was created;
the amount of the current bill payment transaction;
the fee associated with the current bill payment transaction;
the category of the biller/payee; and
whether for the current bill payment transaction the payment method is a credit card or bank account.

29. The method for detecting fraudulent bill payment transactions using dynamic multi-parameter predictive modeling of claim 21 wherein the ensemble method model and/or a regression and classification fraudulent activity model assigns interrelated weights to the one or more interconnected fraudulent bill payment parameters and/or combinations of the one or more interconnected fraudulent bill payment parameters identified in the historical fraudulent bill payment transactions data to generate fraudulent bill payment transaction scoring parameters data.

30. The method for detecting fraudulent bill payment transactions using dynamic multi-parameter predictive modeling of claim 21 wherein the one or more threshold fraudulent bill payment transaction score values include a first threshold fraudulent bill payment transaction score value and a second threshold fraudulent bill payment transaction score value, the first and second threshold fraudulent bill payment transaction score values being defined such that:

if a fraudulent bill payment transaction score value associated with a current bill payment transaction data is greater than the first defined threshold fraudulent bill payment transaction score value, the current bill payment transaction is prevented;

if the a fraudulent bill payment transaction score value associated with a current bill payment transaction data is less than the first defined threshold fraudulent bill payment transaction score value and greater than the second threshold fraudulent bill payment transaction score value, the current bill payment transaction is put on hold; and if the a fraudulent bill payment transaction score value associated with a current bill payment transaction data is less than the second defined threshold fraudulent bill payment transaction score value, the current bill payment transaction is allowed.

\* \* \* \* \*